(12) United States Patent
Winroth et al.

(10) Patent No.: US 11,577,440 B2
(45) Date of Patent: Feb. 14, 2023

(54) METHODS FOR GENERATING INTERFACIAL SURFACES AND DEVICES THEREFOR

(71) Applicant: Material Answers LLC, Weston, MA (US)

(72) Inventors: Scott Allen Winroth, Groton, MA (US); Christopher E. Scott, Weston, MA (US)

(73) Assignee: Material Answers LLC, Weston, MA (US)

( * ) Notice: Subject to any disclaimer, the term of this patent is extended or adjusted under 35 U.S.C. 154(b) by 682 days.

(21) Appl. No.: 16/506,708

(22) Filed: Jul. 9, 2019

(65) Prior Publication Data

US 2020/0009779 A1 Jan. 9, 2020

Related U.S. Application Data

(60) Provisional application No. 62/695,572, filed on Jul. 9, 2018.

(51) Int. Cl.
*B29C 48/71* (2019.01)
*B29C 48/21* (2019.01)
*B29C 48/255* (2019.01)

(52) U.S. Cl.
CPC .............. *B29C 48/71* (2019.02); *B29C 48/21* (2019.02); *B29C 48/255* (2019.02)

(58) Field of Classification Search
CPC ....... B29C 48/08; B29C 48/21; B29C 48/255; B29C 48/70; B29C 48/705; B29C 48/71; B01F 25/432
See application file for complete search history.

(56) References Cited

U.S. PATENT DOCUMENTS

| | | |
|---|---|---|
| 3,195,865 A | 7/1965 | Harder |
| 3,239,197 A | 3/1966 | Tollar |
| 3,743,250 A | 7/1973 | Fitzhugh, Jr. et al. |
| 3,794,300 A | 2/1974 | Harder |
| 4,053,141 A | 10/1977 | Gussefeld |
| 5,094,788 A | 3/1992 | Schrenk et al. |
| 8,215,940 B2 | 7/2012 | Winroth |
| 9,364,988 B2 | 6/2016 | Maia et al. |
| 9,381,694 B2 | 7/2016 | Kanai et al. |
| 2018/0056252 A1* | 3/2018 | Steele .................. B01F 25/4312 |
| 2019/0337211 A1* | 11/2019 | Kazmer .................. B29C 48/06 |

* cited by examiner

*Primary Examiner* — Xiao S Zhao
*Assistant Examiner* — Joseph S Leyson
(74) *Attorney, Agent, or Firm* — Sonapat LLC

(57) ABSTRACT

Embodiments of the present invention include a novel interfacial surface generator (ISG) design comprised of helical channels and associated methods of using the new design. The novel design addresses processing challenges associated with conventional ISG designs used in layer multiplying coextrusion systems. Embodiments of the present invention may be used in either a static configuration or "active" configuration. In one active configuration, two counter-rotating cylindrical rods and/or moving belts may be used to induce drag, or Couette, flow. Conveyance of materials through the ISG may be due to pressure driven flow, drag flow, or a combination of these.

16 Claims, 15 Drawing Sheets

METHODS FOR GENERATING INTERFACIAL SURFACES AND DEVICES THEREFOR

CROSS-REFERENCE TO RELATED APPLICATIONS

This application claims the benefit of U.S. Provisional Application No. 62/695,572, filed on Jul. 9, 2018, the entire contents of which are incorporated by reference herein.

FIELD OF THE INVENTION

The present invention relates to interfacial surface generators and to methods of generating interfacial surfaces in a flowable material.

BACKGROUND OF THE INVENTION

Layer-multiplying coextrusion (LMC) is an innovative processing technique that is used to fabricate micro- and nano-layered polymer composites that are comprised of two or more polymeric materials. The unique physical, mechanical, and electrical properties of these multilayer materials have been exploited by industry to generate novel commercial products in the areas of packaging, filtration, optics, energy storage, and data storage. Expanding the use of LMC to generate new materials and products is an active area of research; however, current LMC technology severely limits the polymer combinations that can be successfully processed. Overcoming current limitations through the development of novel LMC technology is a priority if new applications are to be developed.

LMC systems are very similar to conventional coextrusion systems and typically utilize much of the same standard equipment. LMC has been successfully adapted for use with several extrusion-based processing techniques and used to produce novel materials in the form of cast films and sheets, non-woven mats, fibers, blown films, and blow-molded articles. The primary difference between conventional coextrusion and LMC lies in the use of specially designed layer-multiplying dies (often referred to as interfacial surface generators or ISG's) that are positioned between the feedblock and the final shaping die. ISG's typically receive an initial composite stream comprised of two or more flowable materials arranged in overlapping layers from a feedblock, which is subsequently multiplied as it flows through specially designed channels within the ISG. A number of different ISG designs have been developed, such as those disclosed in U.S. Pat. Nos. 3,195,865; 3,239,197; 5,094,788, and 8,215,940.

ISG's may be combined in series to form composite streams comprised of tens, hundreds, or thousands of layers. The number of layers in the final composite material is controllable and is a function of the number of layers in the initial composite stream and the number of ISG's arranged in series. A series of ISG's may be of substantial length, requiring modifications to manufacturing equipment and/or building infrastructure. For example, commercial LMC systems designed for cast film extrusion that utilize a series of ISG's are often installed on raised platforms to maintain enough clearance between the vertically oriented cast film die and the floor of the manufacturing facility. It is therefore desirable to reduce the size of ISG's in order to reduce physical space requirements. Previous ISG designs utilize substantially linear flow paths, which make achieving this goal difficult. Additionally, the goal of streamlining ISG flow channels to reduce flow instabilities typically conflicts with size reduction efforts. For example, U.S. Pat. No. 9,381,694 teaches the use of an ISG comprised of lengthened flow channels to improve streamlining and reduce flow instabilities. The lengthened flow channels increase the overall size of the ISG. A need exists for novel ISG's designs that provide reduced length while also possessing streamlined flow channels.

Producing polymer composites with uniform layering using the LMC process remains a significant challenge. ISG designs disclosed in the prior art have flow path geometries that impart non-uniform flow patterns. Non-uniform flow causes defects related to layer rearrangement and layer deformation. Defects can negatively affect attributes of the final composite material such as layer thickness, layer uniformity, and visual appearance. Maintaining accurate control over these attributes is beneficial for fabrication of composite materials with desired characteristics.

Viscous encapsulation and second normal stress differences are known causes of layer rearrangement and layer deformation in ISG's. Viscous encapsulation occurs when a shear viscosity mismatch exists between two adjacent polymers. The lower viscosity polymer migrates to the wall and encapsulates, or surrounds, the higher viscosity polymer. The inability to process polymer combinations with high viscosity ratios remains a significant limitation of LMC systems. Usable material combinations are limited to those that have matched (or nearly matched) viscosities within a narrow processing temperature range.

Layer rearrangement can also occur in polymer combinations with matched viscosities due to second normal stress differences. Second normal stress differences cause secondary flow patterns that move perpendicular to the main flow direction. These secondary flow patterns have been shown to occur primarily within asymmetric flow channels. Circular channels with radial symmetry do not exhibit secondary flow patterns. ISG designs typically employ the use of asymmetric rectangular channels and are therefore particularly susceptible to this phenomenon. Polymers with higher elasticity and polymer combinations with high elasticity ratios have been shown to exhibit more severe layer rearrangement due to second normal stress differences.

Increasing the capabilities of LMC systems to process polymer combinations with high viscosity and high elasticity ratios is a recognized challenge. Methods to mitigate layer rearrangement effects due to viscous encapsulation and second normal stress differences have been developed but remain difficult to employ due to geometric constraints within previously developed ISG flow channels. It has been shown that viscous encapsulation effects can be reduced by streamlining the flow channel to maintain a constant cross-sectional area while limiting crossing and secondary flows. Previous ISG designs, such as those disclosed in U.S. Pat. Nos. 5,094,788 and 8,215,940, utilize flow channels with abrupt changes in direction and/or abrupt changes in channel cross-sectional area. ISG designs with improved streamlining, such as those disclosed in U.S. Pat. Nos. 9,364,988 and 9,381,694, have been developed.

Layer rearrangement due to second normal stress differences can be reduced by inducing slip at the interface between the polymer and die walls. However, increasing slip at the walls presents a significant challenge. Attempts to increase wall slip have largely been focused on the use of lubricants. Lubricants have been incorporated into polymers as additives and applied to walls as low-friction coatings. Lubricating additives have been shown to increase slip at the wall and reduce layer rearrangement caused by second normal stress differences. However, lubricating additives also increase internal lubrication, which is undesirable and may cause defects related to interfacial slip between layers. Loading levels must therefore be kept low. Low-friction coatings have been applied to the internal walls of ISG's; however, they are prone to wear. Complete wear through of the coating can occur within hours. The downtime required to disassemble components and reapply the coating makes it impractical for use in a continuous industrial processing operation. A strong need exists for alternative ISG designs that increase wall slip and accommodate polymer combinations with wider ranges of shear viscosity and elongational viscosity ratios.

Interfacial surface generators and static mixers with helical conduits have been developed but are significantly different from the present invention. These include, for example, embodiments mentioned in U.S. Pat. Nos. 3,743,250, 3,794,300 and 4,053,141.

BRIEF SUMMARY OF THE INVENTION

Embodiments of the present invention disclose a novel ISG design comprised of helical channels and associated methods of using the new design. The novel design addresses processing challenges associated with conventional ISG designs used in LMC systems. Embodiments of the present invention may be used in either a static configuration or "active" configuration. In an active configuration, two counter-rotating cylindrical rods and/or moving belts may be used to induce drag flow. Conveyance of materials through the ISG may be due to pressure driven flow, drag flow, or a combination of these.

The ability to actively convey material through the ISG using drag flow reduces (or eliminates) the need for pressure driven flow, which has many advantages. First, a low-pressure flow of molten polymer is less susceptible to abrupt changes in velocity that can cause defects related to unstable flow. Second, the use of low pressure flow opens up the potential to use alternative low-friction housing materials that will increase slip at the polymer/wall interface. Increasing slip has been shown to reduce layer rearrangement resulting from second normal stress differences. Materials such as polytetrafluoroethylene (PTFE) that are incompatible with the high stresses in ISGs fed by pressure-driven flow are now potential candidates. Third, it may be possible to introduce additives or coatings into the multilayer flow during the layer multiplication process. Introduction of additional materials at the layer interface may be used to address issues with adhesion and/or impart additional functionality. Fourth, processing of very high viscosity polymer materials, such as rubbers, that are incompatible with ISG's fed by pressure-driven flow may now be possible.

Any discussion of certain embodiments or features of the invention, including those discussed in the following detailed description or depicted in the figures, serves to illustrate certain exemplary aspects of the invention. The invention is not limited to the embodiments specifically discussed herein or illustrated in the figures.

DETAILED DESCRIPTION OF THE INVENTION

Figure 1A:
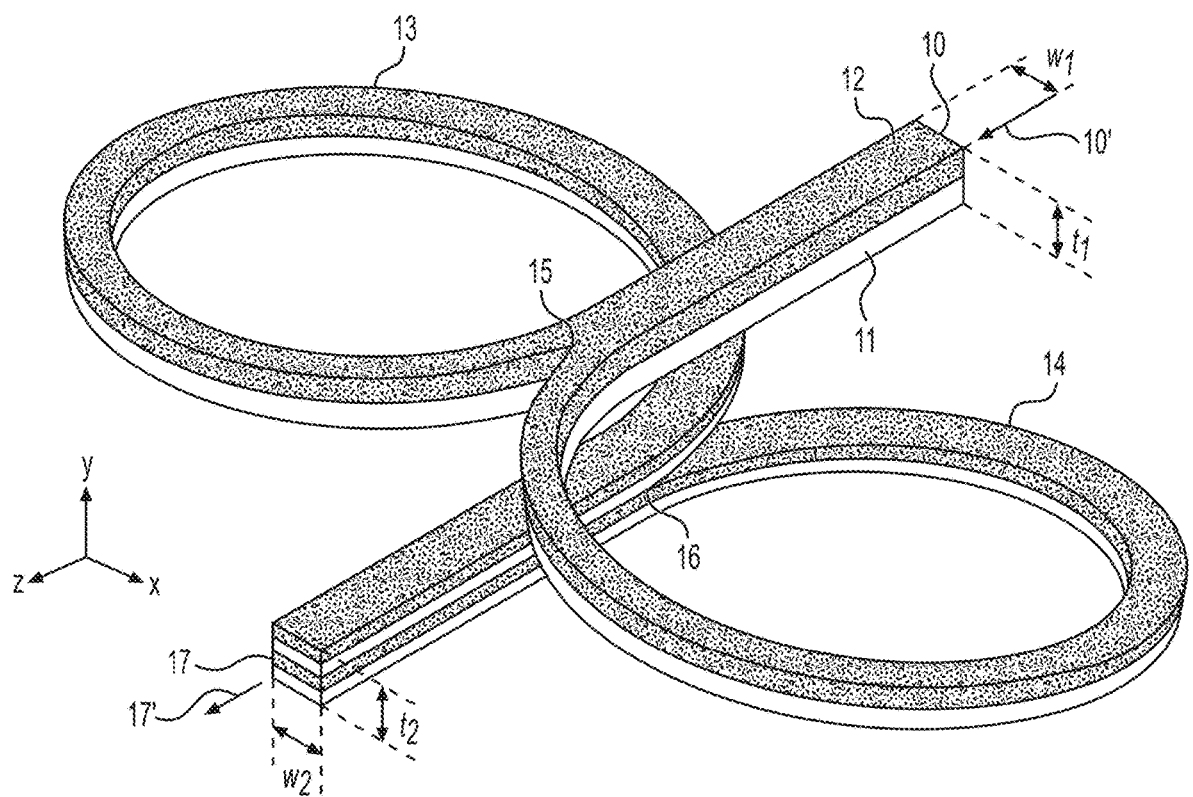
FIG. 1A is an isometric view of an exemplary flow path illustrating the method of generating interfacial surfaces according to a first layer multiplication embodiment.

An embodiment of the invention relates to a method for processing a first composite stream comprised of at least two flowable materials, which comprises:

dividing the first composite stream into two composite sub-streams, each sub-stream comprising the at least two flowable materials;

guiding the first sub-stream along a right-handed helical path and guiding the second sub-stream along a left-handed helical path while compressing both sub-streams in one of either the radial or axial direction of their helical paths simultaneously with expanding both sub-streams in the other of the radial or axial direction of their helical paths; and recombining the sub-streams to form a second composite stream comprising the at least two flowable materials.

The phrase "compressing both sub-streams in one of either the radial or axial direction" refers to compressing both the first sub-stream and the second sub-stream in the radial direction, or, compressing both the first sub-stream and the second sub-stream in the axial direction. Compressing sub-streams "simultaneously" with expanding sub-streams means that when a sub-stream is compressed in the radial direction, then that sub-stream is also expanded in the axial direction. When a sub-stream is compressed in the axial direction, then that sub-stream is also expanded in the radial direction. Simultaneous compression and expansion in a helical path is desirable because, for example, it can allow for constant cross-sectional area to be maintained, which has been shown to reduce layer rearrangement defects in layer multiplication applications. Preferred embodiments for layer multiplication applications utilize simultaneous compression and expansion to achieve substantially constant cross-sectional area of flow within each sub-stream. The simultaneous compression and expansion of one sub-stream in the indicated directions may or may not occur at the same time as the simultaneous compression and expansion of the other sub-stream.

The simultaneous compressing and expanding of each sub-stream may take place over the entirety of the helical paths, or instead may take place over only a portion or portions of the helical paths. Therefore, in some embodiments, the sub-streams can be guided along other portions of their helical paths without being compressed or expanded in any direction. Similarly, in some embodiments, the sub-streams can be guided along other portions of their helical paths while being only compressed or only expanded.

In some embodiments, the method for processing the first composite stream involves layer multiplication. In other embodiments, the method for processing the first composite stream involves mixing the stream. Whether the method is one of layer multiplication or mixing can depend on a number of factors including, but not limited to, the types of flowable materials (e.g. fluids, gases, viscoelastic polymers), the state of the materials (e.g. solid polymer particles vs. molten polymers), and the material flow rates (e.g. laminar flow vs. turbulent flow).

A layer multiplication embodiment of the present invention relates to a novel method for generating interfacial surfaces within a first composite stream comprised of at least two flowable materials arranged in overlapping layers. This method comprises:

dividing the first composite stream into two composite sub-streams, each sub-stream comprising the at least two flowable materials arranged in overlapping layers;

guiding the first sub-stream along a right-handed helical path and guiding the second sub-stream along a left-handed helical path while compressing both sub-streams in one of either the radial or axial direction of their helical paths simultaneously with expanding both sub-streams in the other of the radial or axial direction of their helical paths; and recombining the sub-streams in overlapping relationship to form a second composite stream comprised of a greater number of overlapping layers of flowable material than the first composite stream.

A mixing embodiment of the invention relates to a method for mixing a first composite stream comprised of at least two flowable materials, which comprises:

dividing the first composite stream into two sub-streams, each sub-stream comprising the at least two flowable materials;

guiding the first sub-stream along a right-handed helical path and guiding the second sub-stream along a left-handed helical path while compressing both sub-streams in one of either the radial or axial direction of their helical paths simultaneously with expanding both sub-streams in the other of the radial or axial direction of their helical paths; and recombining the sub-streams to form a second composite stream comprising the at least two flowable materials.

The mixing embodiment may be used to change the distribution of flowable materials in the composite stream, such as to make the composition of the second composite stream more homogenous than the first composite stream.

Flowable materials include those materials amenable to flow through a conduit. As the material flows through the conduit, it is sufficiently deformable so as to adapt its physical dimensions to changes in the conduit's dimensions over the length of the flow path. Flowable materials include, but are not limited to, Newtonian fluids, non-Newtonian fluids, viscoelastic materials, deformable solids (e.g. semi-solids), solids in particulate form (e.g. powders and granules), gases, and fluids and solids that have been heated to render them more deformable. Flowable materials contemplated for use in the present invention include, but are not limited to, polymers (such as thermoplastic polymers and thermoset polymers), including molten polymers, and other viscous or viscoelastic materials. In some embodiments, the highest shear viscosity ratio amongst the shear viscosity ratios between pairs of the flowable materials is greater than or equal to 2 or greater than or equal to 4. In additional embodiments, the highest elongational viscosity ratio amongst the elongational viscosity ratios between pairs of the flowable materials is greater than or equal to 2 or greater than or equal to 4.

Thermoplastic and thermoset polymers that can be used as flowable materials according to embodiments of the invention include, but are not limited to, acrylates such as poly(butyl acrylate), poly(ethyl acrylate), poly(isopropyl acrylate) and poly(methyl acrylate); acrylics such as polyacrylonitrile; amides such as nylon-6, nylon-11, nylon-6,6, nylon-6,9, nylon-6,10 and nylon-6,12; carbonates such as polycarbonate; chlorinated polymers such as poly(vinyl chloride) and chlorinated poly(vinyl chloride); copolymers such as acrylonitrile-butadiene-styrene resin, ethylene-propylene rubber, styrene-acrylonitrile resin and styrene-maleic anhydride resin; esters such as poly(butylene terephthalate), poly(cyclohexanedimethylene terephthalate), poly(ethylene isophthalate), poly(ethylene 2,6-naphthalenedicarboxylate), poly(ethylene phthalate) and poly(ethylene terephthalate); ethers such as polyetheretherketone, polyetherimide, polyethersulfone, polyoxymethylene, poly(phenylene oxide) and polysulfone; fluorinated polymers such as polytetrafluoroethylene and poly(vinylidene fluoride); ketones such as polyetheretherketone; methacrylates such as poly(benzyl methacrylate), poly(butyl methacrylate), poly(cyclohexyl methacrylate), poly(ethyl methacrylate), poly(hexyl methacrylate), poly(isobutyl methacrylate), poly(isopropyl methacrylate), poly(methyl methacrylate), poly(phenyl methacrylate) and poly(propyl methacrylate); olefins such as ethylene-propylene rubber, polyethylene, polyisobutylene, polymethylpentene and polypropylene; uncrosslinked (or lightly crosslinked) rubbers such as ethylene-propylene rubber, ethylene-propylene-diene rubber, styrene-butadiene rubber, polybutadiene, polyisoprene, nitrile rubber, polychloroprene, silicone, fluorosilicone and natural rubber; styrenics such as acrylonitrile-butadiene-styrene resin, polystyrene, styrene-acrylonitrile resin and styrene-maleic anhydride resin; sulfur-containing polymers such as polyethersulfone, poly(phenylene sulfide) and polysulfone; vinyls such as poly(vinyl acetate), poly(vinyl alcohol), and poly(vinyl chloride), thermoplastic polyurethanes, and thermoplastic elastomers.

The term "layer" in the context of methods for generating interfacial surfaces is not limited to perfectly continuous or planar sheets or surfaces. Those skilled in the art recognize that, in practice, a layer multiplication process may produce layers that become unstable and exhibit a curved, wavy or disjointed form. The layers of a material, such as a polymer, may also break up into rods or droplets. The term "layer" as used herein therefore includes the imperfections mentioned above.

An isometric drawing of an exemplary flow path illustrating the method of generating interfacial surfaces according to a first layer multiplication embodiment is provided in FIG. 1A. Alternative views of this flow path are provided in FIGS. 1B-1D for clarity. The flow path depicted in FIGS. 1A-1D comprises a single interfacial surface generator cycle or layer multiplication cycle. According to the method of the first layer multiplication embodiment, a first composite stream 10 is introduced that is moving substantially in the positive z-direction with respect to the Cartesian coordinate system defined in FIG. 1A. The direction of flow is also indicated by arrow 10'. The first composite stream 10 has a thickness $t_1$ in the y-direction and a width $w_1$ in the x-direction as defined in FIG. 1A. The cross-section of the first composite stream in FIGS. 1A-1D is depicted as being substantially square in shape with a thickness to width ratio (t/w) equal to 1.0; however, alternative geometries are contemplated wherein t/w>1.0 or t/w<1.0. As an example, the first composite stream could have a substantially rectangular cross-section, where the cross-section has a width to thickness ratio of greater than or equal to 1.5 or greater than or equal to 8.

The first composite stream 10 may be formed, for example, using a conventional coextrusion feedblock or other suitable technique. It is to be understood that the coordinate system selected for FIGS. 1A-1D is arbitrary and does not preclude alternative orientations.

For simplicity, the first composite stream 10 in FIGS. 1A-1D is comprised of only two flowable material layers—a first flowable material layer 11 and a second flowable material layer 12. It is to be understood that the number of flowable material layers in the first composite stream 10 may be greater than two. The planar interface between the two flowable material layers in FIGS. 1A-1D is substantially parallel to the x-z plane. The first flowable material layer 11 and second flowable material layer 12 may each be comprised of a single type of material or may be comprised of a combination of different types of materials. It is also understood that while FIGS. 1A-1D depict the thicknesses in the y-direction of the first flowable material layer 11 and second flowable material layer 12 as being substantially equal in size, alternative configurations are contemplated wherein the thicknesses of flowable material layers in the first composite stream are not equal in size.

The method of generating interfacial surfaces according to the first layer multiplication embodiment proceeds by dividing the first composite stream 10 into a first composite sub-stream 13 and a second composite sub-stream 14 at vertex 15. Each sub-stream comprises at least two flowable materials arranged in overlapping layers. In many embodiments, the width and thickness of one sub-stream are substantially equal to the width and thickness of the other sub-stream. The first sub-stream 13 is guided along a right-handed helical path while being simultaneously compressed in the axial direction (in this particular exemplary embodiment along the y-axis) of the helical path and expanded in the radial direction (in this particular exemplary embodiment in the xz-plane) of the helical path. In other embodiments, the helix axis may be oriented differently such that the axial and radial directions do not correspond to the y-axis or xz-plane, respectively, in the Cartesian coordinate system provided. The first sub-stream 13 helical path has an inner diameter $D_1$ as defined in FIG. 1B. The sub-stream helical path travels 360 degrees around $D_1$; however, the process of simultaneously compressing the first sub-stream 13 in the axial direction of the helical path and expanding in the radial direction of the helical path is carried out over an angle $\theta_1$ as defined in FIG. 1B, where $0<\theta_1<360$ degrees. As depicted in the exemplary flow path shown in FIGS. 1A-1D, $\theta_1$ is equal to approximately 315 degrees.

The second sub-stream 14 is guided along a left-handed helical path while being simultaneously compressed in the axial direction (in this particular exemplary embodiment along the y-axis) of the helical path and expanded in the radial direction (in this particular exemplary embodiment in the xz-plane) of the helical path. In other embodiments, the helix axis may be oriented differently such that the axial and radial directions do not correspond to the y-axis or xz-plane, respectively, in the Cartesian coordinate system provided. The second sub-stream 14 helical path has an inner diameter $D_2$, as defined in FIG. 1B, which may or may not be equal to $D_1$. In this embodiment the helical paths are circular in shape; however, other embodiments where the paths are oval or elliptical are also contemplated. The sub-stream helical path travels 360 degrees around $D_2$; however, the process of simultaneously compressing the second sub-stream 14 in the axial direction of the helical path and expanding in the radial direction of the helical path is carried out over an angle $\theta_2$ as defined in FIG. 1B, where $0<\theta_2<360$ degrees. As depicted in the exemplary flow path shown in FIGS. 1A-1D, $\theta_2$ is equal to approximately 315 degrees. It is to be understood that angles $\theta_1$ and $\theta_2$ may or may not be equal. The first sub-stream 13 and second sub-stream 14 are recombined at vertex 16 in overlapping relationship to form a second composite stream 17 comprised of a greater number of overlapping layers of flowable material than the first composite stream 10. The flow direction of the second composite sub-stream is indicated by arrow 17' and is substantially in the positive z-direction.

The second composite stream 17 has a thickness $t_2$ in the y-direction and a width $w_2$ in the x-direction as defined in FIG. 1A. It is to be understood that $t_1$ may or may not equal $t_2$. It is also to be understood that $w_1$ may or may not equal $w_2$. In some embodiments, $t_1=t_2$ and $w_1$-$w_2$. The total lead distance L for a single layer multiplication cycle is defined in FIG. 1D as the axial distance traveled from the centerline in the y-direction of the first composite stream 10 to the centerline in the y-direction of the second composite stream 17. As defined in FIG. 1C, the lead distance of the first sub-stream helical path is $L_1$ and the lead distance of the second sub-stream helical path is $L_2$. As with the total lead distance L, the sub-stream lead distances $L_1$ and $L_2$ are measured from the centerline in the y-direction. It is evident from examination of FIG. 1C, that $L_1$ is not equal to $L_2$.

The lead angle of the first sub-stream helical path and the lead angle of the second sub-stream helical path may be constant or may be variable. In FIGS. 1A-1D, the two lead angles are not constant over their respective lead distances $L_1$ and $L_2$, but instead approach minimum values of zero degrees as they transition from their connections to the first composite stream 10 and again as they transition to their connections with the second composite stream 17. The use of sub-stream helices with variable lead angles is desirable since it allows the first composite stream 10 and second composite stream 17 to flow along a path that is substantially parallel to the xz-plane.

For the exemplary flow path illustrated in FIGS. 1A-1D, the helix diameter $D_1$ of the first sub-stream helical path and the helix diameter $D_2$ of the second sub-stream helical path are substantially equal and constant throughout their helical paths. Another contemplated embodiment involves the use of sub-streams wherein the helix diameter $D_1$ of the first sub-stream helical path and the helix diameter $D_2$ of the second sub-stream helical path are not equal and/or are not constant throughout their helical paths.

Another embodiment of the invention is an apparatus for processing a first composite stream comprised of at least two flowable materials, said apparatus comprising a processing region, wherein the processing region comprises:

an inlet conduit for accepting the first composite stream;

means for dividing the first composite stream into two sub-streams;

a first sub-stream conduit in fluid communication with the inlet conduit, said sub-stream conduit following a right-handed helical path, a second sub-stream conduit in fluid communication with the inlet conduit, said sub-stream conduit following a left-handed helical path, both helical paths having dimensions adapted to compress their respective sub-streams in one of either the radial or axial direction of their helical paths simultaneously with expanding their respective sub-streams in the other of the radial or axial direction of their helical paths;

means for recombining the sub-streams to form a second composite stream comprising the at least two flowable materials; and an outlet conduit in fluid communication with the first and second sub-stream conduits.

Such an apparatus may be used, for example, for the processing, layer multiplication or mixing methods described previously. Each apparatus illustrated in FIGS. 2, 3, 4 and 7A can be used for the processing, layer multiplication, or mixing methods such as those described previously. The apparatus of the invention, including the embodiments of FIGS. 2, 3, 4 and 7A, could also be used for any other purpose. Any detailed discussion below of embodiments of the apparatus of the invention used in the context of layer multiplication does not limit them only to that purpose.

Figure 1B:
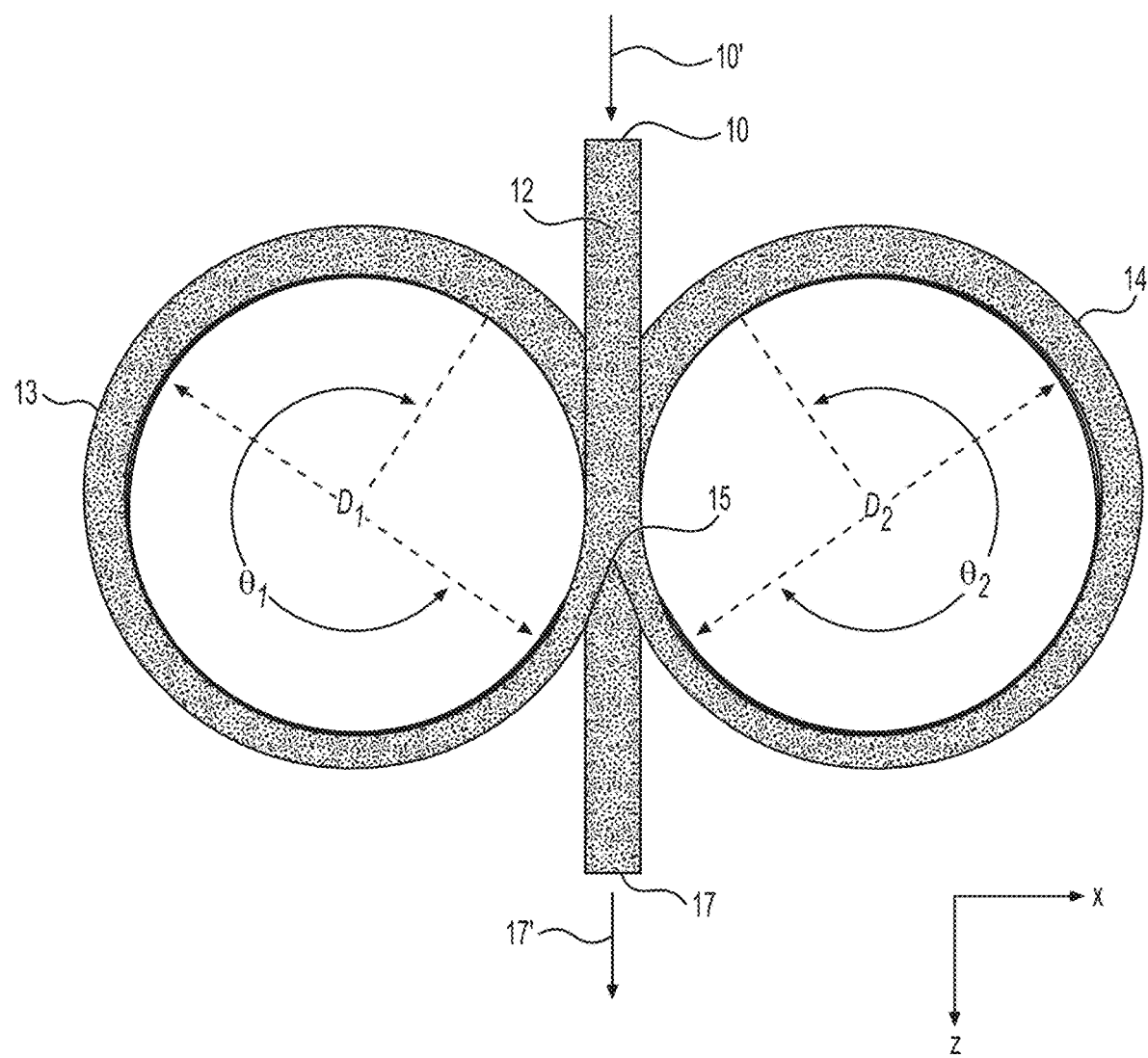
FIG. 1B is a top view of the exemplary flow path shown in FIG. 1A.
Figure 1C:
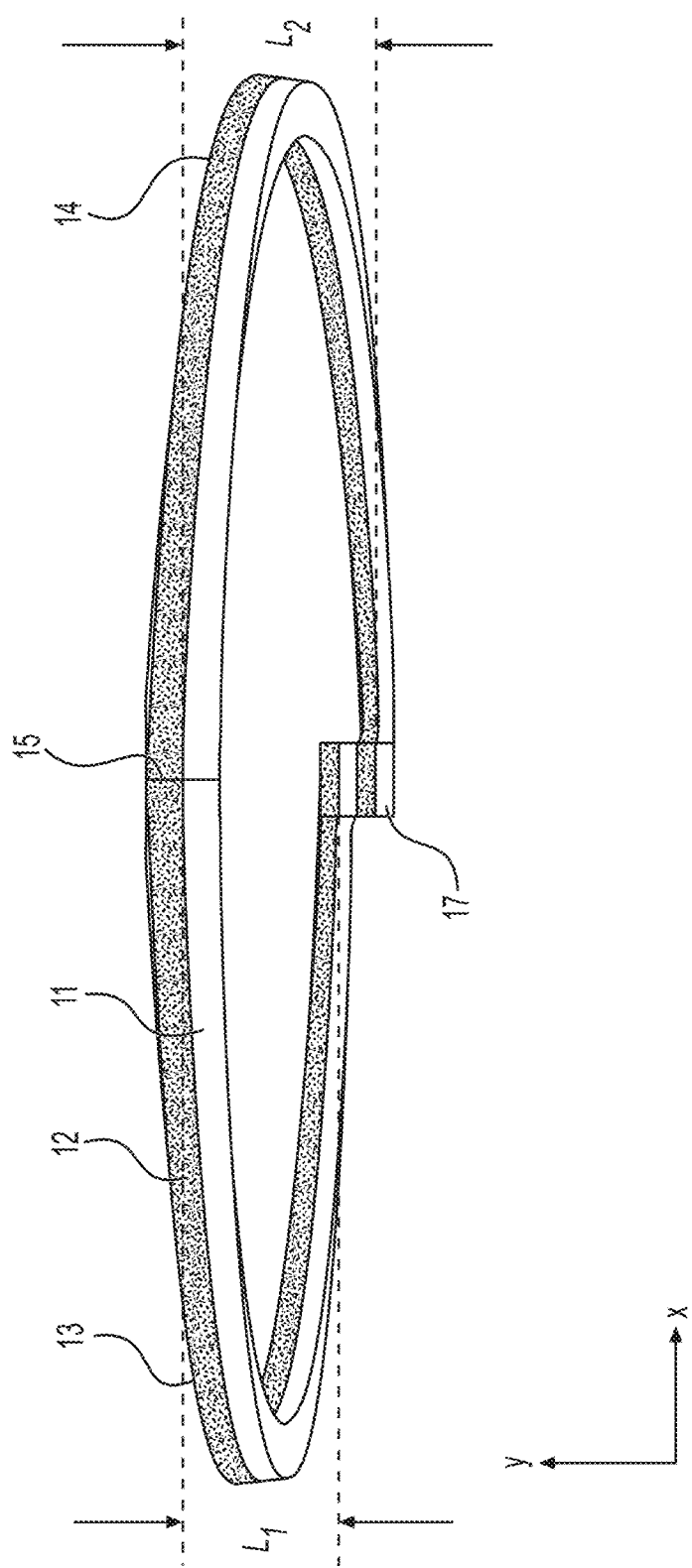
FIG. 1C is a front view of the exemplary flow path shown in FIG. 1A.
Figure 1D:
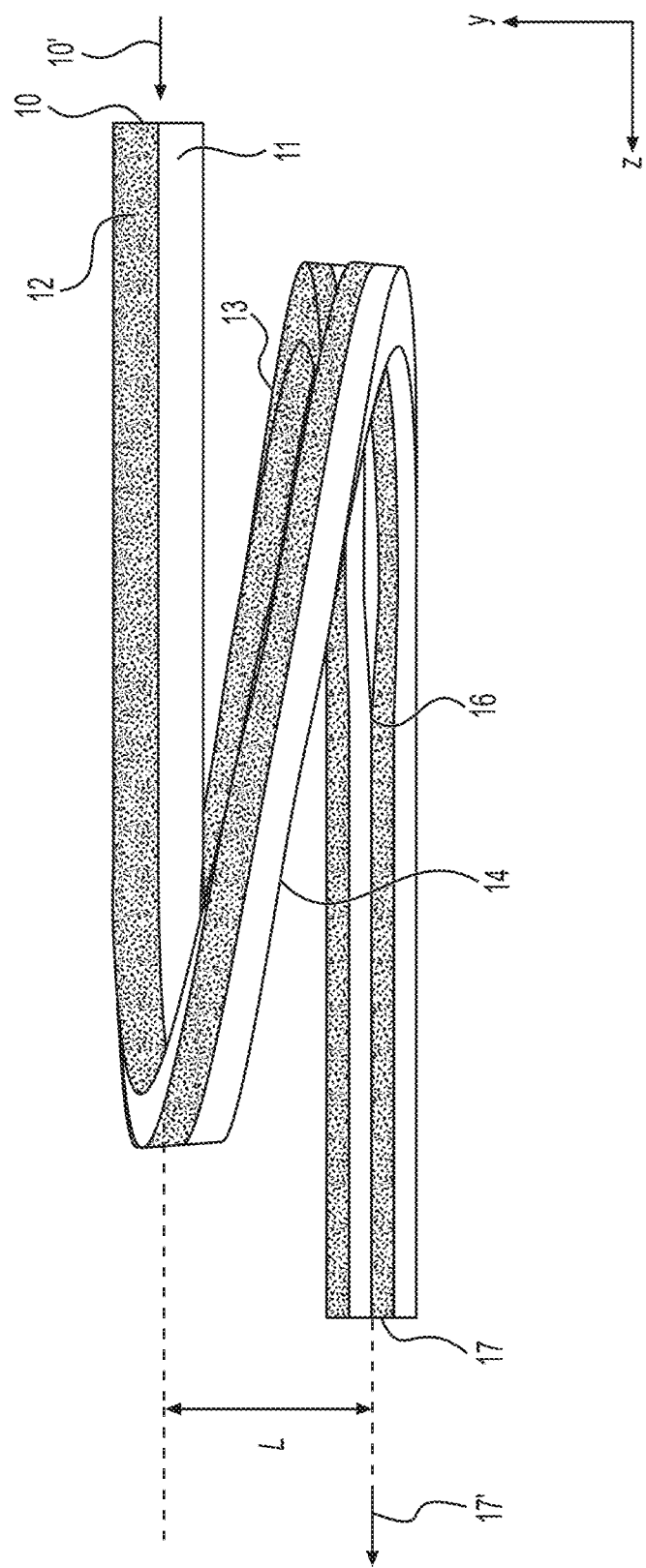
FIG. 1D is a side view of the exemplary flow path shown in FIG. 1A.

The dimensions of the apparatus, including the dimensions of its helical paths, may be chosen from those described previously in the discussion of the methods. For example, the apparatus can include an inlet conduit having a height and width of approximately $t_1$ and $w_1$ to accept the first composite stream such as 10 shown in FIG. 1A (or approximately $t_3$ and $w_3$ for the first composite stream such as 50 shown in FIG. 5A discussed below), and an outlet conduit having a height and width of approximately $t_2$ and $w_2$ for the second composite stream such as 17 shown in FIG. 1A (or approximately $t_4$ and $w_4$ for the second composite stream such as 57 in FIG. 5A discussed below). The helical paths of the apparatus may comprise inner diameters of approximately $D_1$ and $D_2$ for the first and second sub-stream conduits such as shown in FIG. 1B (or approximately $D_3$ and $D_4$ such as shown in FIG. 5B discussed below). The helical paths of the first and second sub-stream conduits may have a total lead distance L for a single processing region such as defined in FIG. 1D (or FIG. 5D discussed below). The lead distance of the first sub-stream conduit helical path and the lead distance of the second sub-stream conduit helical path can be defined as $L_1$ and $L_2$ such as shown in FIG. 1C (or $L_3$ and $L_4$ such as shown in FIG. 5C). The lead angles of the first and second sub-stream conduits may also correspond to those discussed in the context of FIGS. 1A-1D and FIGS. 5A-5D. More specifically, the lead angles of the first and second sub-stream conduits in the apparatus may be constant or variable. In some embodiments, the two lead angles are not constant over their respective lead distances $L_1$ and $L_2$ (or $L_3$ and $L_4$), but instead approach minimum values of zero degrees as they transition from their connections to the inlet conduit and again as they transition to their connections with the outlet conduit. The use of sub-stream conduit helices with variable lead angles is desirable since it allows for positioning the inlet conduit and outlet conduit substantially parallel to the xz-plane. The conduits of the apparatus may also be designed to compress and expand their respective sub-streams over angles $\theta_1$ and $\theta_2$ such as shown in FIG. 1B (or over angles $\theta_3$ and $\theta_4$ such as shown in FIG. 5B).

One embodiment of the apparatus of the invention is an apparatus for generating interfacial surfaces within a first composite stream comprised of at least two flowable materials arranged in overlapping layers, said apparatus comprising a multiplication region, wherein the multiplication region comprises:

an inlet conduit for accepting the first composite stream;

means for dividing the first composite stream into two sub-streams, such that each sub-stream would comprise the at least two flowable materials arranged in overlapping layers;

a first sub-stream conduit in fluid communication with the inlet conduit, said sub-stream conduit following a right-handed helical path, a second sub-stream conduit in fluid communication with the inlet conduit, said sub-stream conduit following a left-handed helical path, both helical paths having dimensions adapted to compress their respective sub-streams in one of either the radial or axial direction of their helical paths simultaneously with expanding their respective sub-streams in the other of the radial or axial direction of their helical paths;

means for recombining the sub-streams in overlapping relationship to form a second composite stream comprised of a greater number of overlapping layers of flowable material than the first composite stream; and an outlet conduit in fluid communication with the first and second sub-stream conduits.

Figure 2:
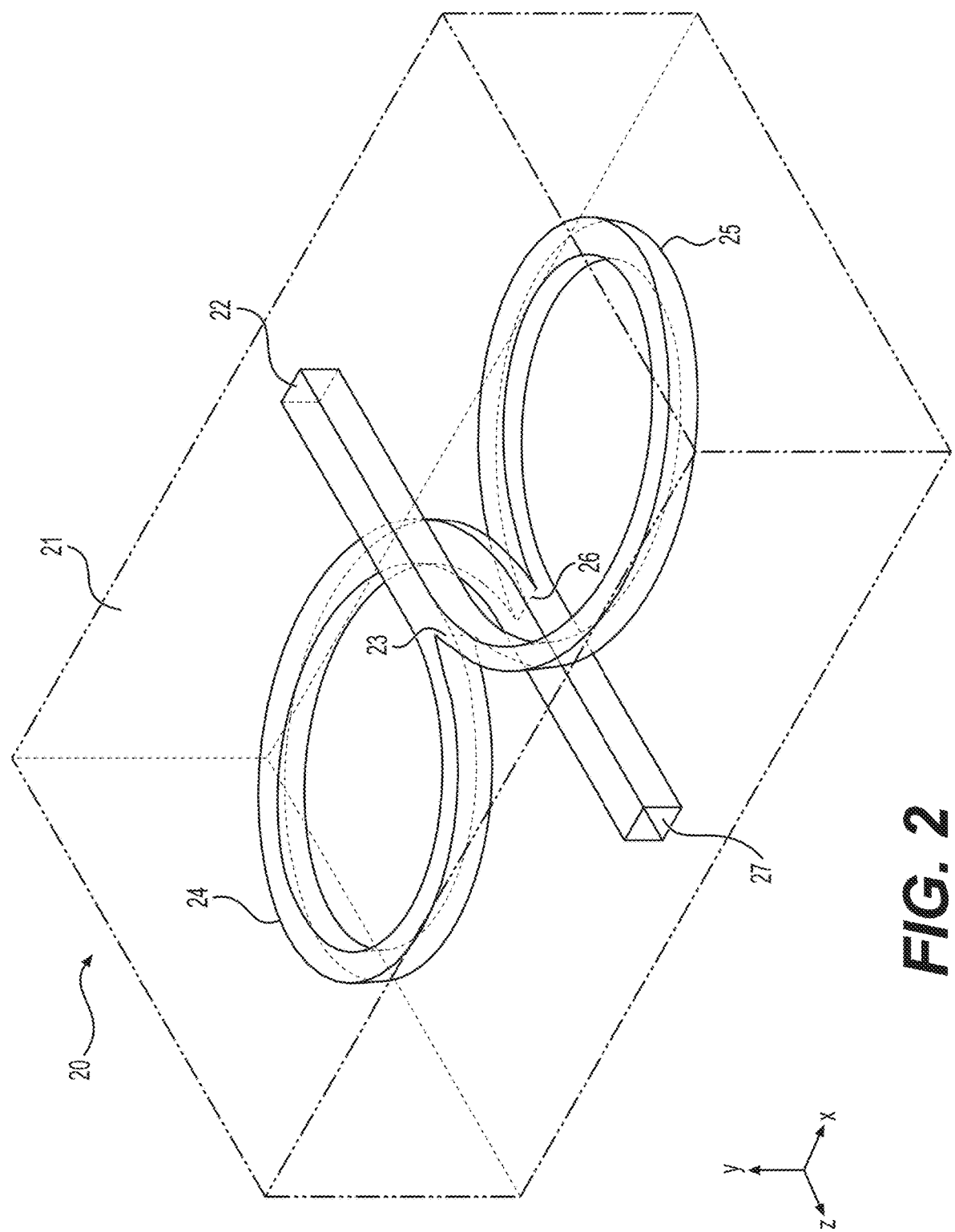
FIG. 2 is an isometric view of an exemplary apparatus comprised of a single layer multiplication cycle according to the method of the first layer multiplication embodiment.

An isometric drawing of an exemplary apparatus 20 for generating interfacial surfaces in accordance with the method of the first layer multiplication embodiment is provided in FIG. 2. The exemplary apparatus is capable of one layer multiplication cycle; however, methods for introducing additional layer multiplication cycles are contemplated and are described in subsequent paragraphs. The outline of the body, or housing, 21 of the exemplary apparatus 20 is identified by phantom lines because the shape of the housing is not considered a significant feature of the apparatus. It is to be understood that alternative housing geometries are possible. For clarity, the internal conduit geometry within the apparatus is displayed as a combination of solid non-hidden lines and dashed hidden lines in FIG. 2.

The exemplary apparatus 20 is comprised of an inlet conduit 22 for accepting a first composite stream; a blade 23 for dividing the first composite stream into two sub-streams; a first sub-stream conduit 24 in fluid communication with the inlet conduit, said sub-stream conduit following a right-handed helical path having dimensions adapted to simultaneously compress the sub-stream in the axial direction of the helical path and expand the sub-stream in the radial direction of the helical path; a second sub-stream conduit 25 in fluid communication with the inlet conduit, said sub-stream conduit following a left-handed helical path having dimensions adapted to simultaneously compress the sub-stream in the axial direction of the helical path and expand the sub-stream in the radial direction of the helical path; a blade 26 for recombining the sub-streams in overlapping relationship;

and an outlet conduit 27 in fluid communication with the first and second sub-stream conduits.

Means for dividing the first composite stream into two sub-streams include, for example, any structure comprising a vertex, including but not limited to a blade or wedge. The vertex may be an edge formed by surfaces of the structure meeting at an angle. Other structures can include any object or protrusion having a height or width of at least the thickness or width, respectively, of the composite stream. The structure may be positioned anywhere in the path of the composite stream flow, forming or placed at a forked passage from the inlet conduit to the first and second sub-stream conduits. Means for recombining the sub-streams can also include any structure comprising a vertex (such as a blade or wedge), but where the sub-streams combine at the vertex rather than divide. Any other structure capable of recombining sub-streams can be used, such as an object or protrusion having a height or width of at least the thickness or width, respectively, of the sub-streams being combined. The structure may be positioned between the first and second sub-streams so as to direct flow of the first and second sub-streams across opposing or different surfaces of the structure ultimately to recombine in an overlapping manner and enter the outlet conduit. For example, a blade or wedge can be positioned to contact flow from the two separate sub-streams on opposing surfaces of the blade or wedge then combine the streams at the blade edge or tapered end of the wedge.

The number of layer multiplication cycles may be increased by connecting a plurality of apparatuses 20 in series. For example, the outlet conduit 27 of a first exemplary apparatus 20 may be connected to the inlet conduit of a second exemplary apparatus to increase the number of layers within the composite stream exiting the outlet conduit of the second exemplary apparatus.

Figure 3:
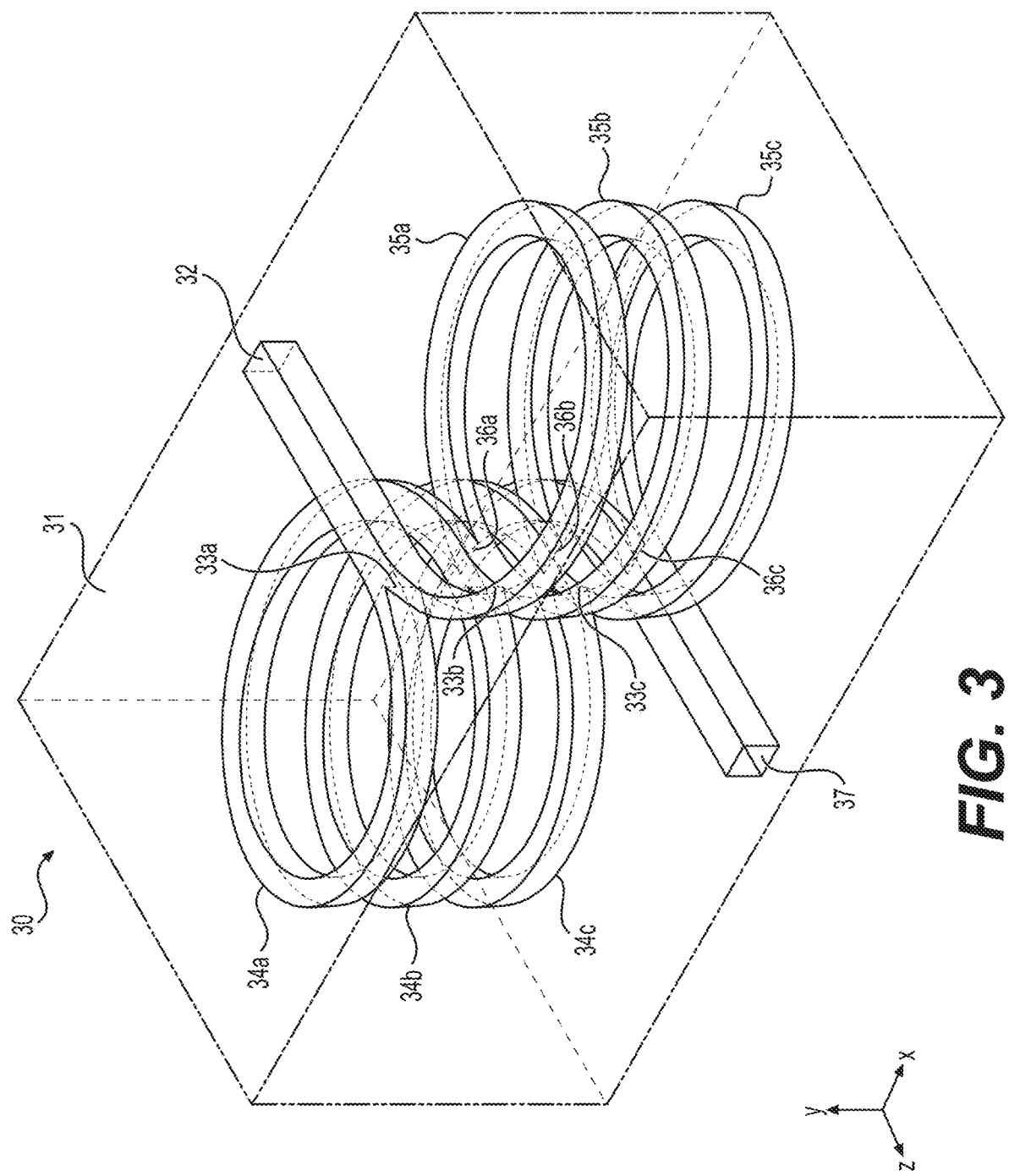
FIG. 3 is an isometric view of an exemplary apparatus illustrating an alternate configuration comprised of three layer multiplication cycles in series.

Alternatively, the number of layer multiplication cycles may be increased by fabricating an apparatus with an alternative conduit configuration that includes a plurality of multiplication cycles. An isometric view of an exemplary apparatus of this type is shown in FIG. 3. The exemplary apparatus 30 is capable of three layer multiplication cycles; however, it is to be understood that the apparatus may be comprised of alternative conduit configurations with a lesser or greater number of layer multiplication cycles. The outline of the body, or housing, 31 of the exemplary apparatus 30 is identified by phantom lines because the shape of the housing is not considered a significant feature of the apparatus. It is to be understood that alternative housing geometries are possible. For clarity, the internal conduit geometry within the apparatus is displayed as a combination of solid non-hidden lines and dashed hidden lines in FIG. 3.

To perform a first layer multiplication cycle, exemplary apparatus 30 is comprised of an inlet conduit 32 for accepting a first composite stream; a blade 33a for dividing the first composite stream into two sub-streams; a first sub-stream conduit 34a in fluid communication with the inlet conduit 32, said sub-stream conduit following a right-handed helical path having dimensions adapted to simultaneously compress the sub-stream in the axial direction of the helical path and expand the sub-stream in the radial direction of the helical path; a second sub-stream conduit 35a in fluid communication with the inlet conduit 32, said sub-stream conduit following a left-handed helical path having dimensions adapted to simultaneously compress the sub-stream in the axial direction of the helical path and expand the sub-stream in the radial direction of the helical path; and a blade 36a for recombining the sub-streams in overlapping relationship to form a second composite stream. The second composite stream is subjected to additional layer multiplication cycles prior to exiting the apparatus 30.

To perform a second layer multiplication cycle, exemplary apparatus 30 is further comprised of a blade 33b for dividing the second composite stream into two sub-streams; a third sub-stream conduit 34b, said sub-stream conduit following a right-handed helical path having dimensions adapted to simultaneously compress the sub-stream in the axial direction of the helical path and expand the sub-stream in the radial direction of the helical path; a fourth sub-stream conduit 35b, said sub-stream conduit following a left-handed helical path having dimensions adapted to simultaneously compress the sub-stream in the axial direction of the helical path and expand the sub-stream in the radial direction of the helical path; and a blade 36b for recombining the sub-streams in overlapping relationship to form a third composite stream.

To perform a third layer multiplication cycle, exemplary apparatus 30 is further comprised of a blade 33c for dividing the third composite stream into two sub-streams; a fifth sub-stream conduit 34c, said sub-stream conduit following a right-handed helical path having dimensions adapted to simultaneously compress the sub-stream in the axial direction of the helical path and expand the sub-stream in the radial direction of the helical path; a sixth sub-stream conduit 35c, said sub-stream conduit following a left-handed helical path having dimensions adapted to simultaneously compress the sub-stream in the axial direction of the helical path and expand the sub-stream in the radial direction of the helical path; a blade 36c for recombining the sub-streams in overlapping relationship to form a fourth composite stream, and an outlet conduit 37 in fluid communication with the fifth and sixth sub-stream conduits, 34c and 35c, respectively.

Exemplary apparatuses 20 and 30 may be fabricated as one single component or as an assembly of multiple components. Methods for fabricating the apparatuses as a single component include, but are not limited to, additive manufacturing techniques that are capable of forming parts with complex internal conduit geometry. The apparatuses may also be fabricated using multiple components. For example, apparatuses may be fabricated from a plurality of stacked plates having substantially planar faces that are stacked in a direction that is approximately parallel to the axes of the helical paths. Apparatuses may also be fabricated, for example, from two or more components that mate at a substantially planar interface that intersects the helix axes of the first sub-stream conduit and the second sub-stream conduit. Apparatuses may be fabricated from a number of materials that include, but are not limited to, metallic materials, non-metallic materials, or a combination of both. Non-metallic materials include, but are not limited to, ceramics, polymers, or a combination of both.

Figure 4:
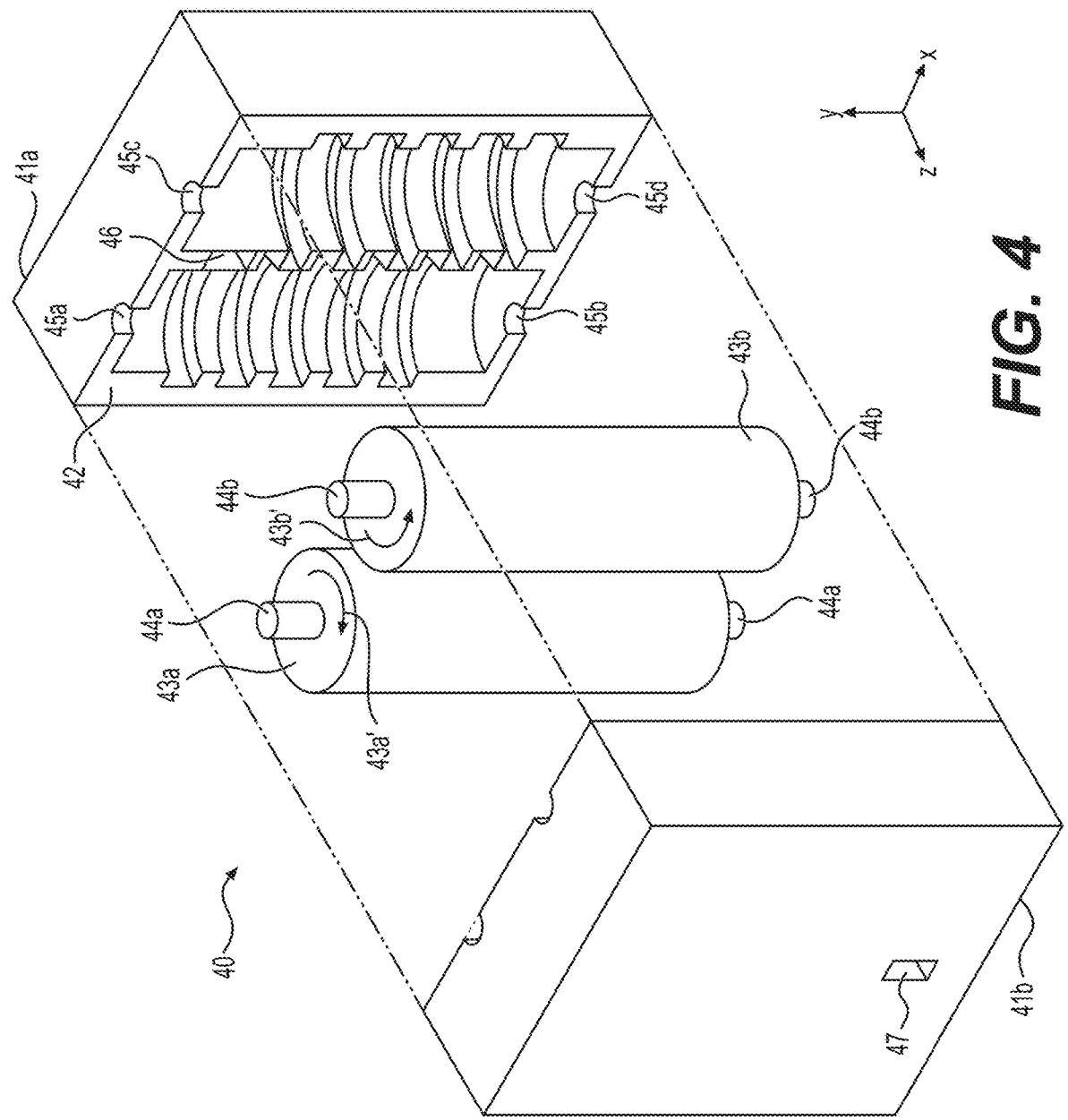
FIG. 4 is an isometric view of an exemplary apparatus illustrating an alternate configuration comprised of five layer multiplication cycles in series and two counter-rotating cylindrical rods positioned with the two helical sub-stream flow paths.

FIG. 4 provides an exploded isometric view of an alternative exemplary apparatus 40 capable of generating interfacial surfaces by inducing drag, or Couette, flow to convey material through the apparatus. Exemplary apparatus 40 is comprised of a housing with integral helical channels that form five layer multiplication cycles; however, it is to be understood that the apparatus may be comprised of alternative conduit configurations with a lesser or greater number of layer multiplication cycles. The housing in the exemplary apparatus comprises two components: housing component 41a and housing component 41b. Integral helical channels are included in both housing component 41a (helical channels shown) and housing component 41b (helical channels hidden, not shown). Housing component 41*a* and housing component 41*b* mate at surface 42, which is substantially parallel to the xy-plane. It is to be understood that this housing configuration is not the only configuration possible. The housing may, for example, be divided into multiple components that mate at interfaces parallel to the xz-plane, yz-plane, or along planes that intersect one or all of the primary planes at an angle. Methods for joining housing components include, but are not limited to, threaded fasteners, welding, brazing, adhesives, or a combination of any of these. Gaskets may be used, for example, on surface 42 to create a hermetic seal.

Two counter-rotating cylinders or rotors, 43*a* and 43*b*, are disposed between housing component 41*a* and housing component 41*b*. The direction of rotation of rotor 43*a* is indicated by arrow 43*a*' and the direction of rotor 43*b* is indicated by arrow 43*b*'. The cylindrical axes of rotors 43*a* and 43*b* are substantially parallel to the axes of helical channels within the housing components. Rotors 43*a* and 43*b* are rigidly connected to shafts 44*a* and 44*b*, respectively. Shafts 44*a* and 44*b* may be separate components or integral to rotors 43*a* and 43*b*. Each shaft is supported radially by the housing. Shaft 44*a* may be supported, for example, at surfaces 45*a* and 45*b* and shaft 44*b* may be supported at surfaces 45*c* and 45*d*. However, the shaft need not be in direct contact with the housing and is preferably supported through the use of bearings. Bearings may be used to support the shafts radially and also to provide thrust support in the axial direction. Bearings contemplated for use include, but are not limited to, plain bearings, sleeve bearings, ball bearings, needle bearings, and combinations thereof. Gaskets or other seals may be used to create a hermetic seal between the housing and bearings and/or the bearings and shafts. Transmission of power to shafts 44*a* and 44*b* may be provided by several means. For example, a separate motor may be coupled to each shaft, which allows the speed of each rotor to be controlled independently. Alternatively, a single motor may power both rotors simultaneously through the use of gearing or other techniques.

The method of operation of exemplary apparatus 40 proceeds in the same manner as exemplary apparatus 30, with the additional step of continuously rotating rotors 43*a* and 43*b* in the direction of arrows 43*a*' and 43*b*', respectively. The cylindrical surfaces of the rotors form surfaces of the conduit wall within the housing. Therefore, in this embodiment and others, all or portions of the first and second sub-stream conduit walls may be defined by a combination of components, such as both the housing and rotors illustrated in FIG. 4. More specifically, FIG. 4 illustrates rotors forming conduit walls along the inner circumference of the helical paths. Rotation of the rotors induces drag, or Couette, flow and provides a way to convey a composite stream through the apparatus. Conveyance of materials through apparatus 40 may be due to pressure driven flow, drag flow, or a combination of these. The initial composite stream is introduced into apparatus 40 at inlet 46 and the resulting composite stream exits at outlet 47.

Another layer multiplication embodiment of the present invention relates to a different method for generating interfacial surfaces within a first composite stream comprised of at least two flowable materials arranged in overlapping layers. An isometric drawing of an exemplary flow path illustrating the method of generating interfacial surfaces is provided in FIG. 5A. Alternative views of this flow path are provided in FIGS. 5B-5D for clarity. The flow path depicted in FIGS. 5A-5D comprises a single interfacial surface generator cycle or layer multiplication cycle. According to the method of this layer multiplication embodiment, a first composite stream 50 is introduced that is moving substantially in the negative z-direction with respect to the Cartesian coordinate system defined in FIGS. 5A-5D. The direction of flow is also indicated by arrow 50'. The first composite stream 50 has a thickness $t_3$ in the y-direction and a width $w_3$ in the x-direction as defined in FIG. 5A. The cross-section of the first composite stream in FIGS. 5A-5D is depicted as being substantially square in shape with a thickness to width ratio (t/w) equal to 1.0; however, alternative geometries are contemplated where t/w>1.0 or t/w<1.0. As an example, the first composite stream could have a substantially rectangular cross-section, where the cross-section has a width to thickness ratio of greater than or equal to 1.5 or greater than or equal to 8.

The first composite stream 50 may be formed, for example, using a conventional coextrusion feedblock or other suitable technique. It is to be understood that the coordinate system selected for FIGS. 5A-5D is arbitrary and does not preclude alternative orientations.

For simplicity, the first composite stream 50 in FIGS. 5A-5D is comprised of only two flowable material layers—a first flowable material layer 51 and a second flowable material layer 52. It is to be understood that the number of flowable material layers in the first composite stream 50 may be greater than two. The planar interface between the two flowable material layers in FIGS. 5A-5D is substantially parallel to the y-z plane. The first flowable material layer 51 and second flowable material layer 52 may each be comprised of a single type of material or may be comprised of a combination of different types of materials. It is also understood that while FIGS. 5A-5D depict the widths in the x-direction of the first flowable material layer 51 and second flowable material layer 52 as being substantially equal in size, alternative configurations are contemplated wherein the widths of flowable material layers in the first composite stream are not equal in size.

The method of generating interfacial surfaces according to this layer multiplication embodiment proceeds by dividing the first composite stream 50 into a first composite sub-stream 53 and a second composite sub-stream 54 at vertex 55. Each sub-stream comprises at least two flowable materials arranged in overlapping layers. In many embodiments, the width and thickness of one sub-stream are substantially equal to the width and thickness of the other sub-stream. The first sub-stream 53 is guided along a right-handed helical path while being simultaneously compressed in the radial direction (in this particular exemplary embodiment in the xz-plane) of the helical path and expanded in the axial direction (in this particular exemplary embodiment along the y-axis) of the helical path. In other embodiments, the helix axis may be oriented differently such that the radial and axial directions do not correspond to the xz-plane or y-axis, respectively, in the Cartesian coordinate system provided. The first sub-stream 53 helical path has an inner diameter $D_3$ as defined in FIG. 5B. The sub-stream helical path travels 360 degrees around $D_3$, however, the process of simultaneously compressing the first sub-stream 53 in the radial direction of the helical path and expanding in the axial direction of the helical path is carried out over an angle $\theta_3$ as defined in FIG. 1B, where 0<$\theta_3$<360 degrees. As depicted in the exemplary flow path shown in FIGS. 5A-5D, $\theta_3$ is equal to approximately 315 degrees.

The second sub-stream 54 is guided along a left-handed helical path while being simultaneously compressed in the radial direction (in this particular exemplary embodiment in the x-z plane) of the helical path and expanded in the axial direction (in this particular exemplary embodiment along the y axis) of the helical path. In other embodiments, the helix axis may be oriented differently such that the radial and axial directions do not correspond to the xz-plane or y-axis, respectively, in the Cartesian coordinate system provided. The second sub-stream 54 helical path has an inner diameter $D_4$, as defined in FIG. 5B, which may or may not be equal to $D_3$. In this embodiment the helical paths are circular in shape; however, other embodiments where the paths are oval or elliptical are also contemplated. The sub-stream helical path travels 360 degrees around $D_4$, however, the process of simultaneously compressing the second sub-stream 54 in the radial direction of the helical path and expanding in the axial direction of the helical path is carried out over an angle $\theta_4$ as defined in FIG. 5B, where $0<\theta_4<360$ degrees. As depicted in the exemplary flow path shown in FIGS. 1A-1D, $\theta_4$ is equal to approximately 315 degrees. It is to be understood that angles $\theta_3$ and $\theta_4$ may or may not be equal. The first sub-stream 53 and second sub-stream 54 are recombined at vertex 56 in overlapping relationship to form a second composite stream 57 comprised of a greater number of overlapping layers of flowable material than the first composite stream 50. The flow direction of the second composite sub-stream is indicated by arrow 57' and is substantially in the negative z-direction.

Figure 5A:
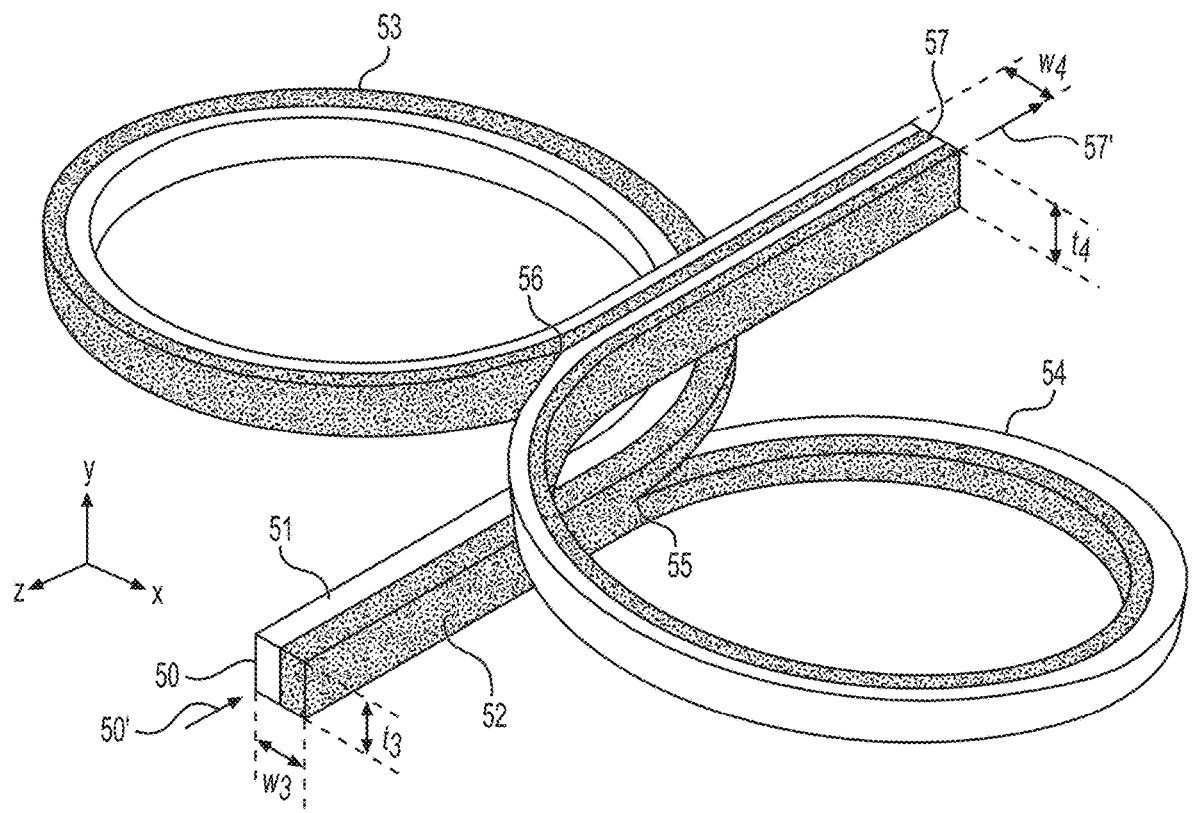
FIG. 5A is an isometric view of an exemplary flow path illustrating the method of generating interfacial surfaces according to another layer multiplication embodiment.
Figure 5B:
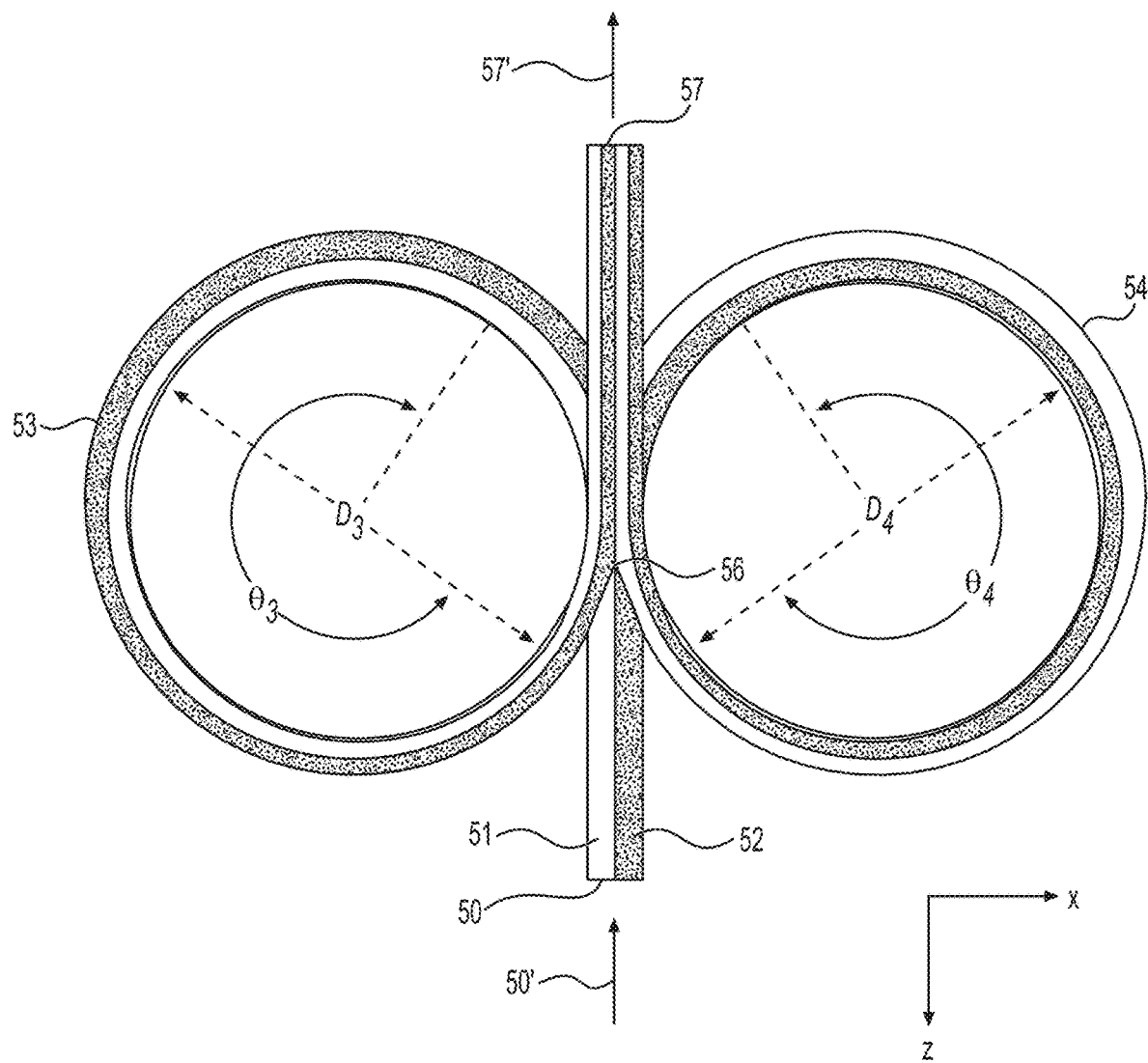
FIG. 5B is a top view of the exemplary flow path shown in FIG. 5A.
Figure 5C:
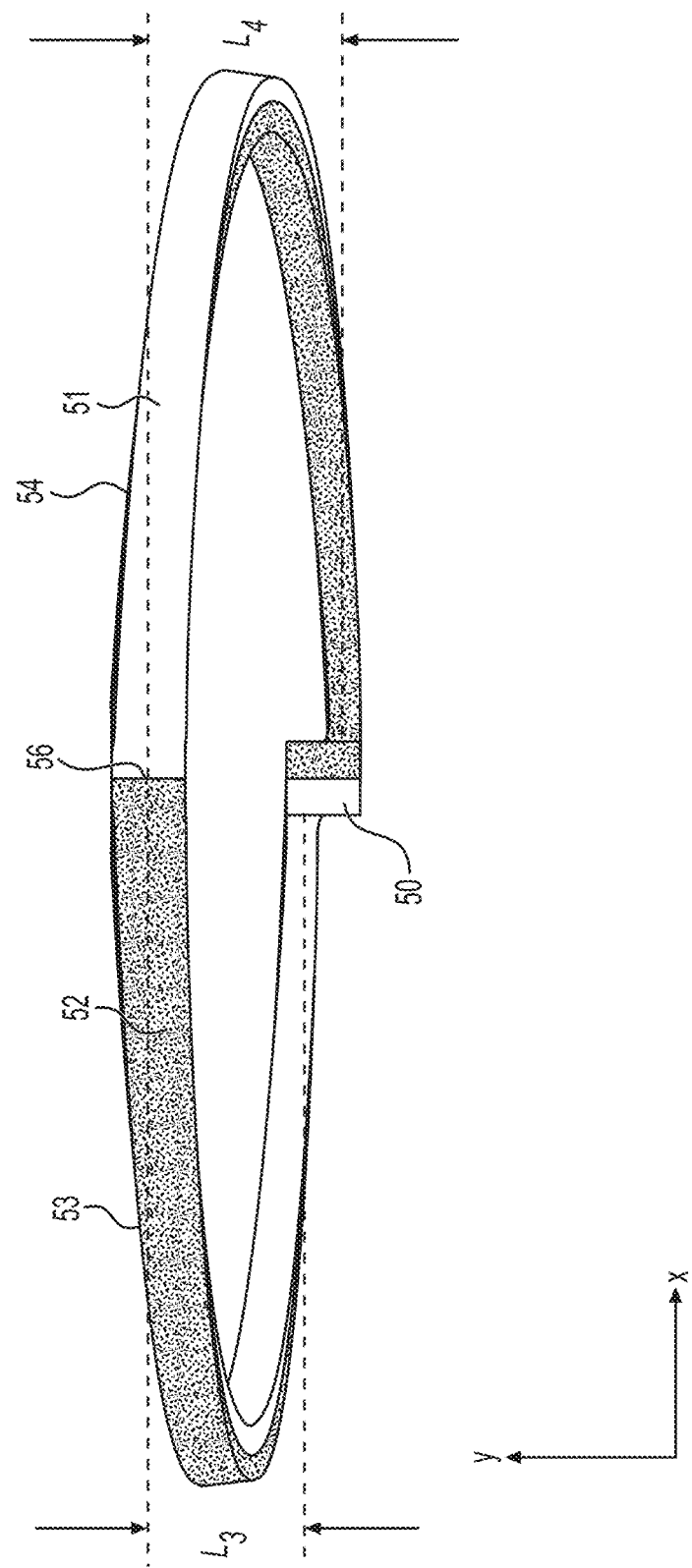
FIG. 5C is a front view of the exemplary flow path shown in FIG. 5A.
Figure 5D:
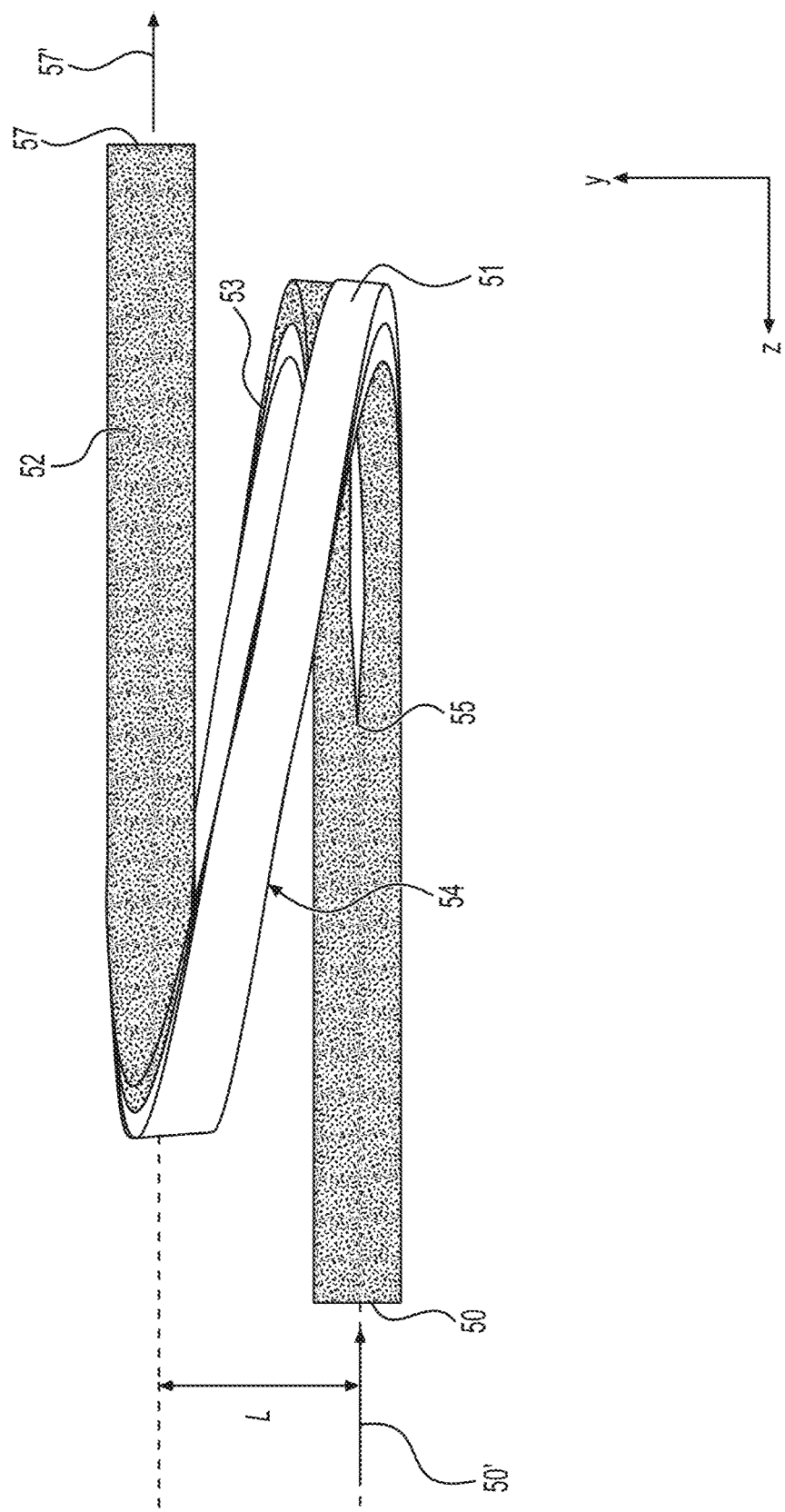
FIG. 5D is a side view of the exemplary flow path shown in FIG. 5A.

The second composite stream 57 has a thickness $t_4$ in the y-direction and a width $w_4$ in the x-direction as defined in FIG. 5A. It is to be understood that $t_3$ may or may not equal $t_4$. It is also to be understood that $w_3$ may or may not equal $w_4$. In some embodiments, $t_3=t_4$ and $w_3=w_4$. The total lead distance L for a single layer multiplication cycle is defined in FIG. 5D as the axial distance traveled from the centerline in the y-direction of the first composite stream 50 to the centerline in the y-direction of the second composite stream 57. As defined in FIG. 5C, the lead distance of the first sub-stream helical path is $L_3$ and the lead distance of the second sub-stream helical path is $L_4$. As with the total lead distance L, the sub-stream lead distances $L_3$ and $L_4$ are measured from the centerline in the y-direction. It is evident from examination of FIG. 5C, that $L_3$ is not equal to $L_4$.

The lead angle of the first sub-stream helical path and the lead angle of the second sub-stream helical path may be constant or may be variable. In FIGS. 5A-5D, the two lead angles are not constant over their respective lead distances $L_3$ and $L_4$ but instead approach minimum values of zero degrees as they transition from their connections to the first composite stream 50 and again as they transition to their connections with the second composite stream 57. The use of sub-stream helices with variable lead angles is desirable since it allows the first composite stream 50 and second composite stream 57 to flow along a path that is substantially parallel to the xz-plane.

For the exemplary flow path illustrated in FIGS. 5A-5D, the helix diameter $D_3$ of the first sub-stream helical path and the helix diameter $D_3$ of the second sub-stream helical path are substantially equal and constant throughout their helical paths. Another contemplated embodiment involves the use of sub-streams wherein the helix diameter $D_3$ of the first sub-stream helical path and the helix diameter $D_4$ of the second sub-stream helical path are not equal and/or are not constant throughout their helical paths.

Figure 6A:
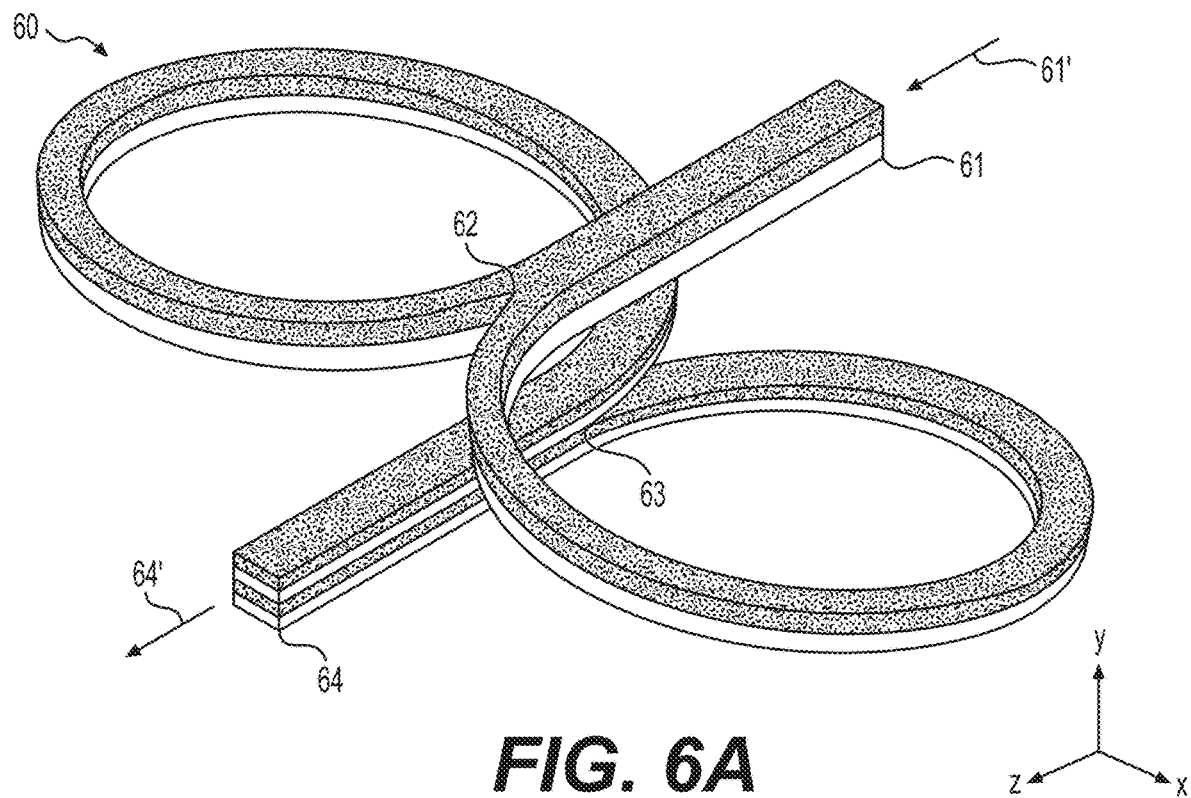
FIG. 6A is an isometric view of an exemplary flow path illustrating a first method of generating interfacial surfaces.
Figure 6B:
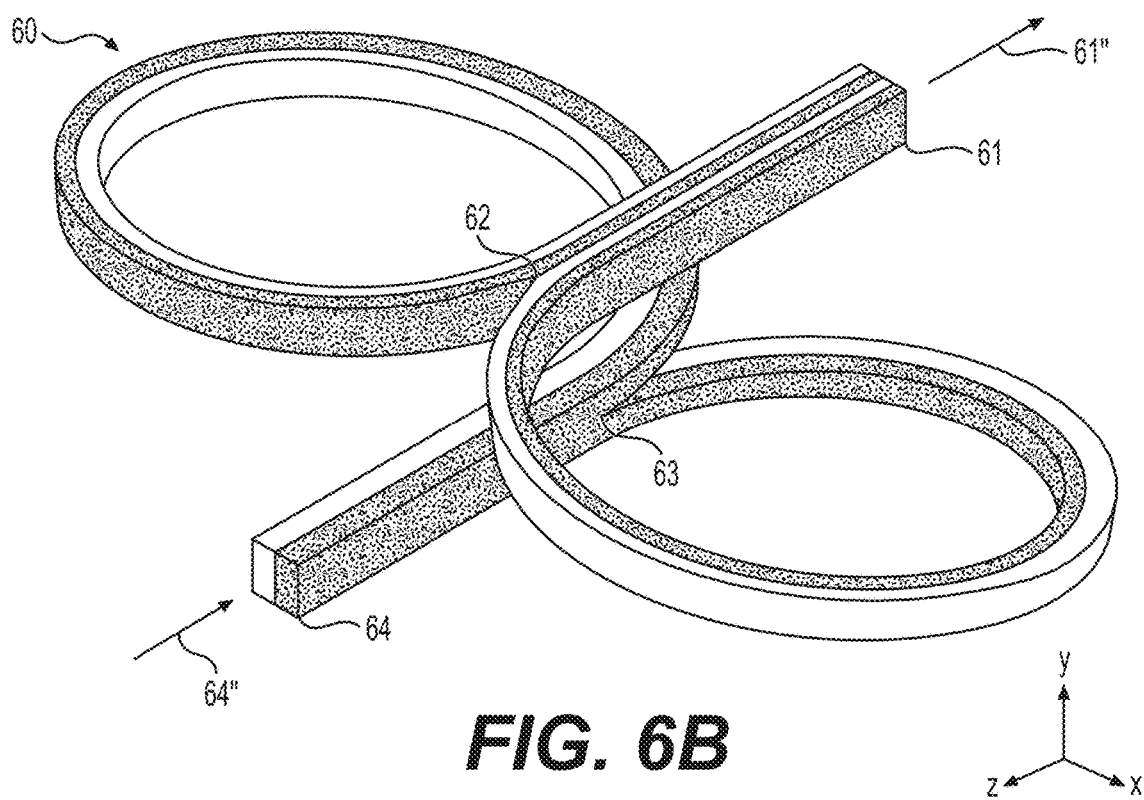
FIG. 6B illustrates a different method of generating interfacial surfaces using the same exemplary flow path shown in FIG. 6A but with material flow in the opposite direction.
Figure 6C:
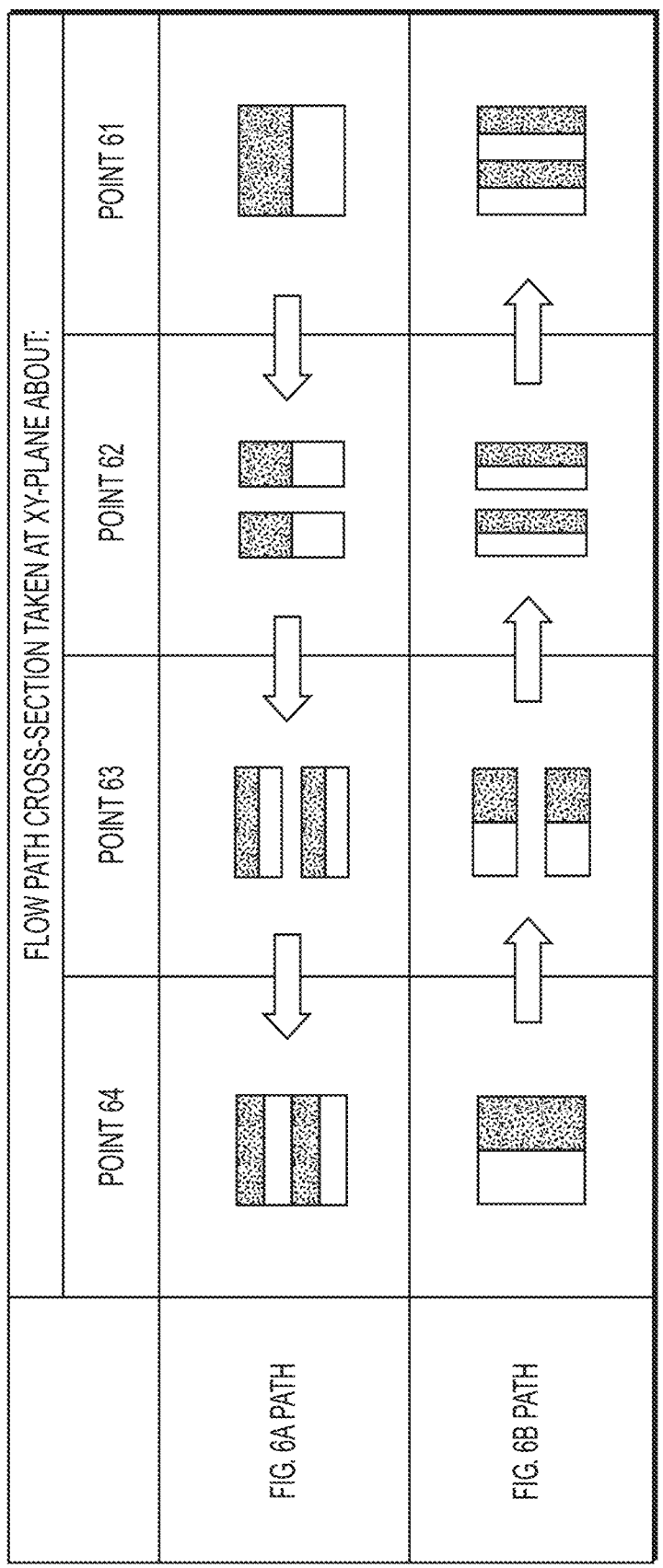
FIG. 6C provides a comparison of cross-sections from FIGS. 6A and 6B taken at four reference points on the flow path.

FIGS. 6A-6C further illustrate aspects of embodiments shown in FIGS. 1A-1D and FIGS. 5A-5D. FIGS. 6A and 6B illustrate how the same flow path 60 can be utilized in two different ways to practice two methods of achieving a layer multiplication cycle. Four reference points on flow path 60 are indicated by 61, 62, 63, and 64. Cross-sections of the flow paths depicted in FIGS. 6A and 6B are illustrated in FIG. 6C. The cross-sections shown in FIG. 6C are taken at the reference points and are substantially parallel to the xy-plane. Block arrows shown in FIG. 6C indicate the order of progression based on flow direction. In FIG. 6A the material inlet is at point 61 and the material outlet is at point 64. The direction of flow in FIG. 6A is substantially in the positive z-direction as indicated by arrows 61' and 64'. In contrast, the flow path 60 in FIG. 6B has an inlet at point 64 and an outlet at point 61. The direction of flow in FIG. 6B is substantially in the negative z-direction as indicated by arrows 61" and 64". In FIG. 6A the inlet composite stream at point 61 is comprised of overlapping layers with a planar interface substantially perpendicular to the axes of the sub-stream helices. In contrast, in FIG. 6B the inlet composite stream at point 64 is comprised of overlapping layers with a planar interface substantially parallel to the axes of the sub-stream helices. Practice of the method as shown in FIG. 6A comprises expanding each sub-stream in the radial direction while compressing it in the axial direction. In contrast, practice of the method as shown in FIG. 6B comprises expanding each sub-stream in the axial direction while compressing it in the radial direction. The exemplary apparatuses 20, 30, 40, and 70 shown in FIGS. 2-4 and 7A can be utilized to practice methods illustrated in FIGS. 6A and 6B, as well as methods illustrated previously in FIGS. 1 and 5. When practicing methods illustrated in FIGS. 5A-5D and 6B, the inlets and outlets are reversed from what is shown in FIGS. 2-4 and 7A. In the case of exemplary apparatus 40, the direction of rotation of rotors 43a and 43b must also be reversed from the direction shown in FIG. 4 when practicing methods illustrated in FIGS. 5A-5D and 6B.

Figure 7A:
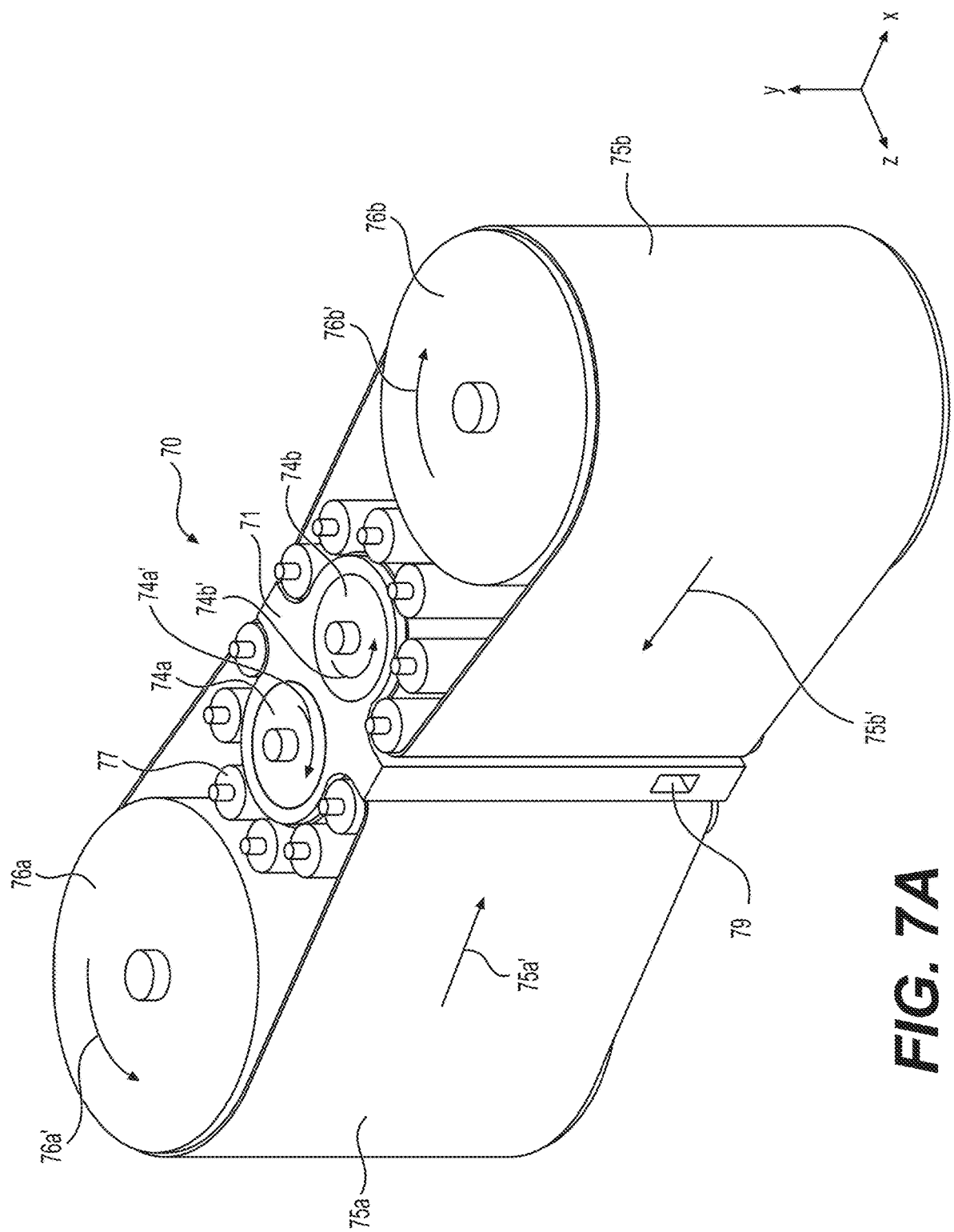
FIG. 7A is a perspective view of an exemplary apparatus capable of generating interfacial surfaces by inducing drag, or Couette, flow to convey material through the apparatus.

FIG. 7A provides a perspective view of an alternative exemplary apparatus 70 capable of generating interfacial surfaces by inducing drag, or Couette, flow to convey material through the apparatus. Exemplary apparatus 70 is comprised of a housing 71 with integral helical channels that form five layer multiplication cycles. It is to be understood that this configuration is not the only configuration possible. The apparatus may, for example, be comprised of alternative conduit configurations with a lesser or greater number of layer multiplication cycles. The housing may also be divided into multiple components.

Figure 7B:
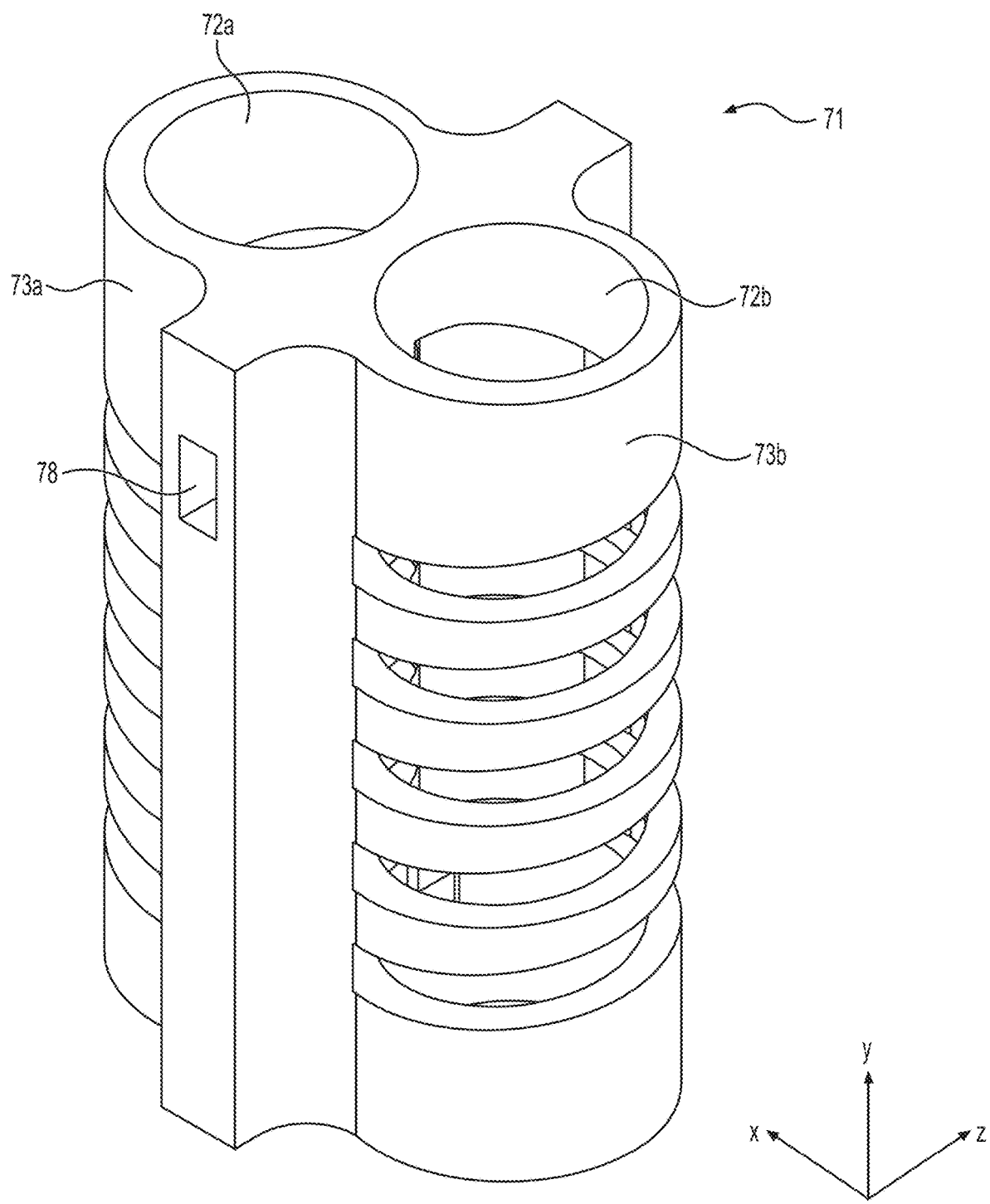
FIG. 7B is an alternative perspective view of the housing shown in FIG. 7A.

An alternative perspective view of housing 71 is shown separately in FIG. 7B. It should be noted that the view in FIG. 7B is rotated 180-degrees about the y-axis with respect to the view shown in FIG. 7A. In FIG. 7B, it can be seen that the design of housing 71 causes the integral helical channels to have only side walls—inner walls at cylindrical surfaces 72a-b and outer walls at cylindrical surfaces 73a-b are formed by other components. Inner helical channel walls are formed by two counter-rotating cylinders or rotors, 74a and 74b, as shown in FIG. 7A. The cylindrical axes of rotors 74a and 74b are substantially parallel to the axes of helical channels within the housing components. Arrows 74a' and 74b' in FIG. 7A indicate the direction of rotor rotation when the apparatus is operated in accordance with the method of the first layer multiplication embodiment illustrated in FIG. 1A-D. Outer helical channel walls are formed by two continuous belts, 75a and 75b, as shown in FIG. 7A. Arrows 75a' and 75b' in FIG. 7A indicate the direction of belt motion when the apparatus is operated in accordance with the method of the first layer multiplication embodiment illustrated in FIG. 1A-D. Belts 75a and 75b are driven by rollers 76a and 76b, respectively. Arrows 76a', and 76b' in FIG. 7A indicate the direction of roller rotation when operated according to the method of the first layer multiplication embodiment identified in FIG. 1A-D. Any alternative means for generating motion of the belts can also be used.

Transmission of power to rotors 74*a-b* and drive rollers 76*a-b* may be provided by several techniques. For example, a separate motor may be coupled to each shaft, which allows the speed of each rotor and drive roller to be controlled independently. Alternatively, a single motor may power both rotors, both drive rollers, or both rotors and both drive rollers simultaneously through the use of gearing or other techniques. A series of smaller rollers 77 are used to guide belts 75*a* and 75*b* around cylindrical surfaces 73*a* and 73*b*. Belts 75*a* and 75*b* may or may not be in sliding contact with cylindrical surfaces 73*a* and 73*b*. Any alternative means for guiding the belts can also be used.

The method of operation of exemplary apparatus 70 proceeds in the same manner as exemplary apparatus 40, with the additional step of continuously rotating drive rollers 76*a* and 76*b* in the direction of arrows 76*a*' and 76*b*', respectively. The surfaces of belts 75*a* and 75*b* form surfaces of the conduit wall of the housing. All or portions of the first and second sub-stream conduit walls in this and any other embodiments may be defined by a combination of components, such as by a combination of the housing, rotors and belts illustrated in FIGS. 7A and 7B. More specifically, FIGS. 7A and 7B illustrate rotors forming conduit walls along the inner circumference of the helical paths, belts forming conduit walls along at least a portion of the outer circumference of the helical paths, and the housing forming the remaining portions of the conduit walls. Rotation of the rotors and belts induces drag, or Couette, flow at two surfaces for each helical channel and provides a way to convey a composite stream through the apparatus. Conveyance of materials through apparatus 70 may be due to pressure driven flow, drag flow, or a combination of these. The initial composite stream is introduced into apparatus 70 at inlet 78 shown in FIG. 7B and the resulting composite stream exits at outlet 79 shown in FIG. 7A.

EXAMPLES

Example 1

An ISG apparatus, similar to the exemplary apparatus shown in FIG. 2, was fabricated to demonstrate its operation under the condition where materials are conveyed through the apparatus by way of pressure. The apparatus was designed to subject an initial two-layer composite stream to a single layer multiplication cycle to form a second composite stream with four layers. The apparatus was configured and operated to generate interfacial surfaces according to the method illustrated in FIGS. 1A-1D.

An apparatus housing was fabricated as a single component from acrylonitrile butadiene styrene (ABS) plastic using an additive manufacturing (3D printing) process. Internal flow path conduits were formed within the housing during the additive manufacturing process—no subsequent manufacturing processes (additive or subtractive) were required. The housing was oriented such that the inlet conduit was on the top surface and the outlet was on the bottom surface. The housing was raised up on a support stand to create clearance for material to exit from the outlet on the bottom surface of the housing.

Two identical rubbery polymers with moderately-low viscosity at room temperature were prepared. The polymers were prepared by cross-linking polyvinyl acetate with an aqueous solution containing boric acid and sodium bicarbonate. Blue colorant was added to Polymer A to differentiate it from Polymer B, which was white in color. A dual-cavity reservoir component was fabricated from ABS plastic to store the two polymer test materials prior to operation. The dual-cavity reservoir was comprised of two separate compartments with two rectangular inlets at the top surface and two rectangular outlets at the bottom surface. The outlets were sized such that the combined cross-sectional areas of the two outlets was equivalent to the cross-sectional area of the housing inlet. The dual cavity reservoir was mounted to the top surface of the housing just above the inlet opening. The two reservoir cavities were then filled—one with polymer material A and one with polymer material B. A dual-piston plunger was fabricated to pressurize materials within the dual-cavity reservoir and force them through the apparatus.

To operate the apparatus, the dual-piston plunger was inserted into the dual-cavity reservoir inlets and downward pressure was applied. Polymer materials A and B were forced, by pressure, into the housing inlet, forming an initial two-layer composite stream with an approximate 50:50 layer ratio. Continuous pressure was applied to the dual piston plunger to force the materials through the internal conduits within the apparatus. A four-layer polymer stream with an A-B-A-B layer configuration was observed exiting from the outlet at the bottom surface of the housing.

Example 2

An ISG apparatus with counter rotating rotors, similar to the exemplary apparatus shown in FIG. 4, was fabricated to demonstrate its operation under the condition where materials are conveyed through the apparatus by way of drag, or Couette, flow induced by the rotation of two counter-rotating rotors. The apparatus was designed to subject an initial two-layer composite stream to a single layer multiplication cycle to form a second composite stream with four layers. The apparatus was configured and operated to generate interfacial surfaces according to the method illustrated in FIGS. 1A-1D.

An apparatus housing was fabricated as two components, similar to the exemplary housing shown in FIG. 4, from ABS plastic using an additive manufacturing process. Flow path conduits were formed in the housing components during the additive manufacturing process—no subsequent manufacturing processes (additive or subtractive) were required to fabricate the housing. The housing was oriented such that the inlet conduit was on the top surface and the outlet was on the bottom surface. The housing was raised up on a support stand to create clearance for material to exit from the outlet on the bottom surface.

Two 63.5 mm diameter rotors were fabricated from cylindrical aluminum tubing and inserted into the housing. The clearance gap between the outer surface of each rotor and the housing wall was approximately 0.2 mm. A cylindrical steel shaft was inserted through an axial center hole in each rotor. The rotors were affixed to the shafts using set screws. Each shaft was supported by plain bronze bearings at both ends. A matched set of gears with a 1:1 gear ratio was used to generate counter rotating motion between the two rotors. One gear was attached to each shaft and held rigidly in place using set screws. The shaft of an electric motor was then coupled to the end of one of the rotor shafts. The motor frame was fastened to the same stationary support stand as the housing using threaded fasteners.

Two identical rubbery polymers with moderately-low viscosity at room temperature were prepared. The polymers were prepared by cross-linking polyvinyl acetate with an aqueous solution containing boric acid and sodium bicarbonate. Blue colorant was added to Polymer A to differentiate it from Polymer B, which was white in color. The same dual-cavity reservoir component from Example 1 was used to store the two polymer test materials prior to operation. The dual cavity reservoir was mounted to the top surface of the housing just above the inlet opening. The two reservoir cavities were then filled—one with polymer material A and one with polymer material B.

To operate the apparatus, the electric motor was powered on and allowed to rotate continuously at a speed of approximately 3 revolutions per minute (rpm). Since the motor was directly coupled to one of the rotor shafts, the rotational speed of the counter-rotating rotors was also 3 rpm. Polymer materials A and B were gravity-fed into the apparatus inlet, forming an initial two-layer composite stream with an approximate 50:50 layer ratio. The initial composite stream was conveyed through the apparatus by drag, or Couette, flow by the action of the counter-rotating rotors. A four-layer polymer stream with an A-B-A-B layer configuration was observed exiting from the outlet at the bottom surface of the apparatus.

Example 3

The apparatus from Example 2 is reconfigured and operated to generate interfacial surfaces according to the method illustrated in FIGS. 5A-5D. The same polymer materials from Example 2 are used. The apparatus housing is reoriented such that the outlet from Example 2 is positioned to be on the top surface and the inlet is positioned to be on the bottom surface. The dual cavity reservoir is placed on the new top surface and rotated 90-degrees relative the orientation used in Example 2. The two reservoir cavities are then filled—one with polymer material A and one with polymer material B.

To operate the apparatus, the electric motor is powered on and allowed to rotate continuously at a speed of approximately 3 revolutions per minute (rpm) in the opposite direction that was used in Example 2. Polymer materials A and B are gravity-fed into the apparatus inlet (the outlet from Example 2), forming an initial two-layer composite stream with an approximate 50:50 layer ratio. The initial composite stream is conveyed through the apparatus by drag, or Couette, flow by the action of the counter-rotating rotors. A four-layer polymer stream with an A-B-A-B layer configuration is observed exiting from the apparatus outlet (the inlet from Example 2) at the bottom surface. The layer interfaces produced during Example 3 are rotated 90-degrees relative to the layer interfaces produced during Example 2.

Example 4

The apparatus from Example 2 is retested to demonstrate its operation under the condition where materials are conveyed through the apparatus by a combination of pressure and drag, or Couette, flow induced by the rotation of two counter-rotating rotors. The same polymer materials from Example 2 are used.

To operate the apparatus, the electric motor is powered on and allowed to rotate continuously at a speed of approximately 3 revolutions per minute (rpm). The dual-piston plunger is inserted into the dual-cavity reservoir inlets and downward pressure is applied. Polymer materials A and B are forced, by pressure, into the apparatus inlet, forming an initial two-layer composite stream with an approximate 50:50 layer ratio. The initial composite stream is conveyed through the apparatus by a combination of pressure and drag, or Couette, flow. A four-layer polymer stream with an A-B-A-B layer configuration is observed exiting from the outlet at the bottom surface of the apparatus.

The invention claimed is:

1. A method for processing a first composite stream comprised of at least two flowable materials, which comprises:
    dividing the first composite stream into two composite sub-streams, each sub-stream comprising the at least two flowable materials;
    guiding the first sub-stream along a right-handed helical path and guiding the second sub-stream along a left-handed helical path while compressing both sub-streams in one of either the radial or axial direction of their helical paths simultaneously with expanding both sub-streams in the other of the radial or axial direction of their helical paths; and
    recombining the sub-streams to form a second composite stream comprising the at least two flowable materials.

2. The method of claim 1, wherein the method for processing is a method for generating interfacial surfaces within the first composite stream comprised of the at least two flowable materials arranged in overlapping layers, said method comprising:
    dividing the first composite stream into the two composite sub-streams, each sub-stream comprising the at least two flowable materials arranged in overlapping layers;
    guiding the first sub-stream along the right-handed helical path and guiding the second sub-stream along the left-handed helical path while compressing both sub-streams in one of either the radial or axial direction of their helical paths simultaneously with expanding both sub-streams in the other of the radial or axial direction of their helical paths; and
    recombining the sub-streams in an overlapping relationship to form the second composite stream comprised of a greater number of overlapping layers of flowable material than the first composite stream.

3. The method of claim 2, which comprises:
    guiding the first sub-stream along the right-handed helical path while compressing the sub-stream in the radial direction of the helical path simultaneously with expanding the sub-stream in the axial direction of the helical path; and
    guiding the second sub-stream along the left-handed helical path while compressing the sub-stream in the radial direction of the helical path simultaneously with expanding the sub-stream in the axial direction of the helical path.

4. The method of claim 2, which comprises:
    guiding the first sub-stream along the right-handed helical path while compressing the sub-stream in the axial direction of the helical path simultaneously with expanding the sub-stream in the radial direction of the helical path; and
    guiding the second sub-stream along the left-handed helical path while compressing the sub-stream in the axial direction of the helical path simultaneously with expanding the sub-stream in the radial direction of the helical path.

5. The method of claim 2, wherein at least one flowable material of the at least two flowable materials comprises a polymer.

6. The method of claim 5, wherein the polymer is a thermoplastic.

7. The method of claim 5, wherein the polymer is a thermoset.

8. The method of claim 1, wherein the method for processing is a method for mixing the first composite stream comprised of the at least two flowable materials, which comprises:
dividing the first composite stream into the two sub-streams, each sub-stream comprising the at least two flowable materials;
guiding the first sub-stream along the right-handed helical path and guiding the second sub-stream along the left-handed helical path while compressing both sub-streams in one of either the radial or axial direction of their helical paths simultaneously with expanding both sub-streams in the other of the radial or axial direction of their helical paths; and
recombining the sub-streams to form the second composite stream comprising the at least two flowable materials.

9. The method of claim 1, which further comprises repeating the method at least once, wherein the first composite stream for the practice of each repetition is the second composite stream formed by practice of its immediately preceding method.

10. The method of claim 1, wherein the diameter of the first sub-stream helical path is equal to the diameter of the second sub-stream helical path.

11. The method of claim 1, wherein the diameter of each helical path is constant throughout the helical path.

12. The method of claim 1, wherein the helix axes of the first sub-stream helical path and second sub-stream helical path are parallel.

13. The method of claim 1, wherein the step of compressing both sub-streams in one of either the radial or axial direction of their helical paths simultaneously with expanding both sub-streams in the other of the radial or axial direction of their helical paths occurs over an arc angle, for each stream, of greater than or equal to 91 degrees.

14. The method of claim 1, wherein the flowable materials are conveyed by pressure driven flow.

15. The method of claim 1, wherein the flowable materials are conveyed at least in part by drag flow.

16. The method of claim 15, wherein the drag flow is accomplished by rotating components within the interiors of the helical paths, or by components in motion along at least a portion of the outer circumferences of the helical paths, or by both.

* * * * *